(12) United States Patent
Dearlove et al.

(10) Patent No.: US 8,156,013 B2
(45) Date of Patent: Apr. 10, 2012

(54) METHODS AND APPARATUS FOR FULFILLING TOTE DELIVERIES

(75) Inventors: Janice Vivienne Dearlove, Seattle, WA (US); Ward W. Vuillemot, Seattle, WA (US); Jeffrey A. Wilke, Mercer Island, WA (US); Douglas J. Herrington, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 12/825,249

(22) Filed: Jun. 28, 2010

(65) Prior Publication Data

US 2011/0320034 A1     Dec. 29, 2011

(51) Int. Cl.
*G06Q 30/00*      (2012.01)
*G06F 7/00*       (2006.01)

(52) U.S. Cl. .......................... 705/27.1; 700/216
(58) Field of Classification Search ............... 705/26–27
See application file for complete search history.

(56) References Cited

U.S. PATENT DOCUMENTS

| | | | |
|---|---|---|---|
| 5,586,686 A | 12/1996 | Bustos et al. | |
| 6,064,980 A | 5/2000 | Jacobi et al. | |
| 6,974,928 B2 | 12/2005 | Bloom | |
| 6,975,937 B1 | 12/2005 | Kantarjiev et al. | |
| 7,013,238 B1 | 3/2006 | Weare | |
| 7,040,541 B2 | 5/2006 | Swartz et al. | |
| 7,177,825 B1 | 2/2007 | Borders et al. | |
| 7,353,194 B1 | 4/2008 | Kerker et al. | |
| 7,376,572 B2 | 5/2008 | Siegel | |
| 7,532,947 B2 | 5/2009 | Waddington et al. | |
| 7,590,562 B2 | 9/2009 | Stoppelman | |
| 7,590,564 B1 | 9/2009 | Ward et al. | |
| 7,590,565 B2 | 9/2009 | Ward et al. | |
| 7,792,712 B2 | 9/2010 | Kantarjiev et al. | |
| 2001/0047315 A1 | 11/2001 | Siegel | |
| 2002/0019783 A1 | 2/2002 | ChoI | |
| 2002/0046056 A1 | 4/2002 | Demarco et al. | |
| 2002/0046132 A1 | 4/2002 | Raye et al. | |
| 2002/0050526 A1 | 5/2002 | Swartz et al. | |
| 2002/0143638 A1 | 10/2002 | August et al. | |

(Continued)

OTHER PUBLICATIONS

Pet Food Goes Online on Wheels (McKinney, M., Knight Ridder Tribune Business News, Washington, Jan. 14, 2007, p. 1).*

(Continued)

*Primary Examiner* — Adam Levine
*Assistant Examiner* — Ethan D Civan
(74) *Attorney, Agent, or Firm* — Robert C. Kowert; Meyertons, Hood, Kivlin, Kowert & Goetzel, P.C.

(57) ABSTRACT

Methods and apparatus for fulfilling tote delivery orders. A tote delivery service directs delivery of items ordered by customers via a network site to delivery addresses corresponding to the customers in reusable totes on assigned tote delivery days. Tote delivery data may be processed to generate bulk transfer data for fulfillment centers and zone delivery data for sortation nodes. Each fulfillment center may pick items indicated by the bulk transfer data and bulk transfer the items to particular sortation nodes. At a sortation node, the items in the received bulk transfers, and possibly items received from other sources such as direct transfers from vendors, are rebinned into totes corresponding to delivery addresses in zones. The totes are loaded onto delivery vehicles, which deliver the totes to the delivery addresses in particular zones served by the sortation node. The zones and tote delivery days may be determined by zip code.

31 Claims, 17 Drawing Sheets

U.S. PATENT DOCUMENTS

| | | | |
|---|---|---|---|
| 2002/0178074 A1* | 11/2002 | Bloom | 705/26 |
| 2003/0014330 A1* | 1/2003 | Showghi et al. | 705/26 |
| 2003/0135432 A1 | 7/2003 | McIntyre et al. | |
| 2004/0075557 A1 | 4/2004 | Selwyn | |
| 2004/0117384 A1 | 6/2004 | Ray | |
| 2004/0143518 A1 | 7/2004 | Siegel | |
| 2004/0143519 A1 | 7/2004 | Siegel | |
| 2005/0080689 A1 | 4/2005 | Liberman | |
| 2005/0137901 A1 | 6/2005 | Siegel | |
| 2005/0175441 A1* | 8/2005 | Liberman | 414/807 |
| 2006/0026031 A1* | 2/2006 | Gentling | 705/1 |
| 2006/0085250 A1 | 4/2006 | Kantarjiev et al. | |
| 2006/0122899 A1 | 6/2006 | Lee et al. | |
| 2006/0173749 A1 | 8/2006 | Ward et al. | |
| 2007/0000921 A1 | 1/2007 | Butler et al. | |
| 2007/0005437 A1 | 1/2007 | Stoppelman | |
| 2007/0016463 A1 | 1/2007 | Borders et al. | |
| 2007/0078725 A1* | 4/2007 | Koszewski et al. | 705/26 |
| 2007/0112647 A1 | 5/2007 | Borders et al. | |
| 2007/0162353 A1 | 7/2007 | Borders et al. | |
| 2007/0265937 A1 | 11/2007 | Aitkins | |
| 2008/0015951 A1 | 1/2008 | Kerker et al. | |
| 2008/0115465 A1 | 5/2008 | Dickinson | |
| 2009/0000912 A1* | 1/2009 | Battles et al. | 198/431 |
| 2009/0076863 A1* | 3/2009 | Kraft et al. | 705/5 |
| 2009/0081008 A1* | 3/2009 | Somin et al. | 414/222.07 |
| 2009/0083162 A1 | 3/2009 | Rimnac, Jr. | |
| 2009/0099984 A1 | 4/2009 | Zhu et al. | |
| 2009/0132459 A1 | 5/2009 | Hicks | |
| 2009/0266722 A1 | 10/2009 | Rogers et al. | |
| 2009/0299880 A1 | 12/2009 | Stoppelman | |
| 2010/0030578 A1 | 2/2010 | Siddique et al. | |
| 2010/0036752 A1 | 2/2010 | Berkin et al. | |
| 2010/0250336 A1 | 9/2010 | Selinger et al. | |

OTHER PUBLICATIONS

U.S. Appl. No. 12/825,226, filed Jun. 28, 2010.
U.S. Appl. No. 12/825,243, filed Jun. 28, 2010.
Harris, et al., "Amazon starts grocery delivery service," Last updated Aug. 1, 2007, 3 pages.
"Frequently Asked Questions—ILL and Van Delivery," 3 pages, 2005.
"AmazonFresh", Wikipedia, last modified Jun. 24, 2010, 2 pages.
"FreshDirect," Wikipedia, last modified Jan. 28, 2008, 3 pages.
Nick Finck, "Buying Peaches, E-Commercse Style," Published Aug. 29, 1999, 5 pages.
"Kozmo.com," Wikipedia, last modified Jul. 10, 2006, 2 pages.
U.S. Appl. No. 12/825,234, filed Jun. 28, 2010.
U.S. Appl. No. 12/825,254, filed Jun. 28, 2010.
"Peapod," Wikipedia, last modified Nov. 16, 2007, 4 pages.
"Webvan," Wikipedia, last modified Jun. 23, 2010, 3 pages.
Office Action from U.S. Appl. No. 12/825,234 mailed Dec. 9, 2010, 14 pages.
Office Action from U.S. Appl. No. 12/825,243 mailed Nov. 29, 2010, 25 pages.
Office Action from U.S. Appl. No. 12/825,226 mailed Nov. 10, 2010, 20 pages.
Office Action from U.S. Appl. No. 12/825,254 mailed Dec. 8, 2010, 14 pages.
Requirements for Intermodal Equipment Providers and Motor Carriers and Drivers Operating Intermodal Equipment (Federal Register, vol. 71, issue 245, p. 76796, Dec. 21, 2006).
RFID Gains Credibility (Katz, J., Industry Week, Cleveland, Jan. 2007, vol. 256, issue 1, p. 35).
Wireless Tracking System Unvelied (Criscione, P., The Brampton Guardian, Brampton, Ontario, Dec. 1, 2006, p. 1).

\* cited by examiner

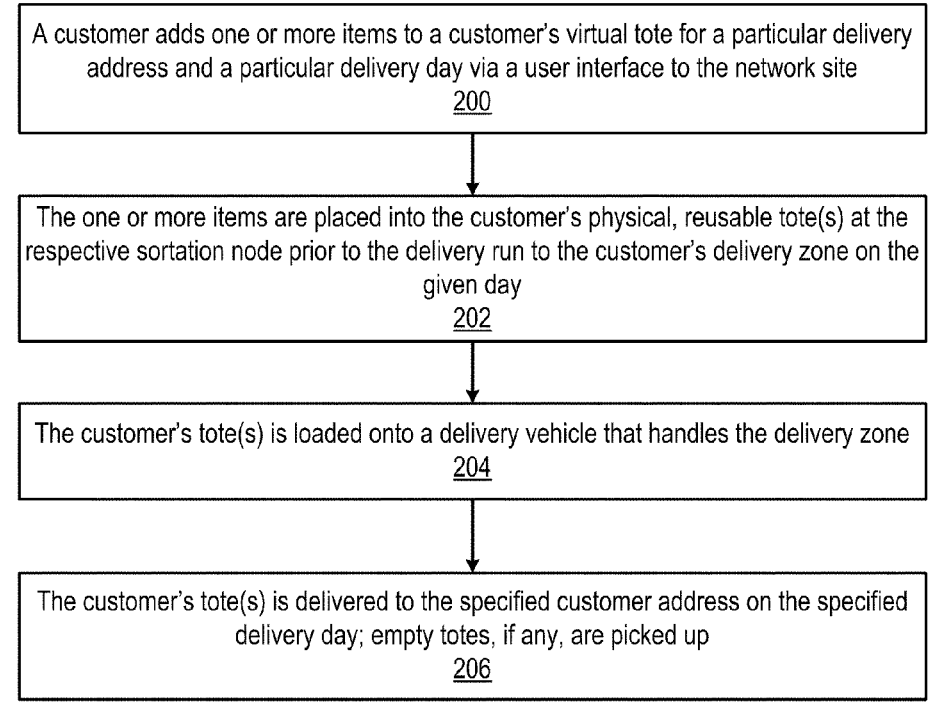
*Figure 3*
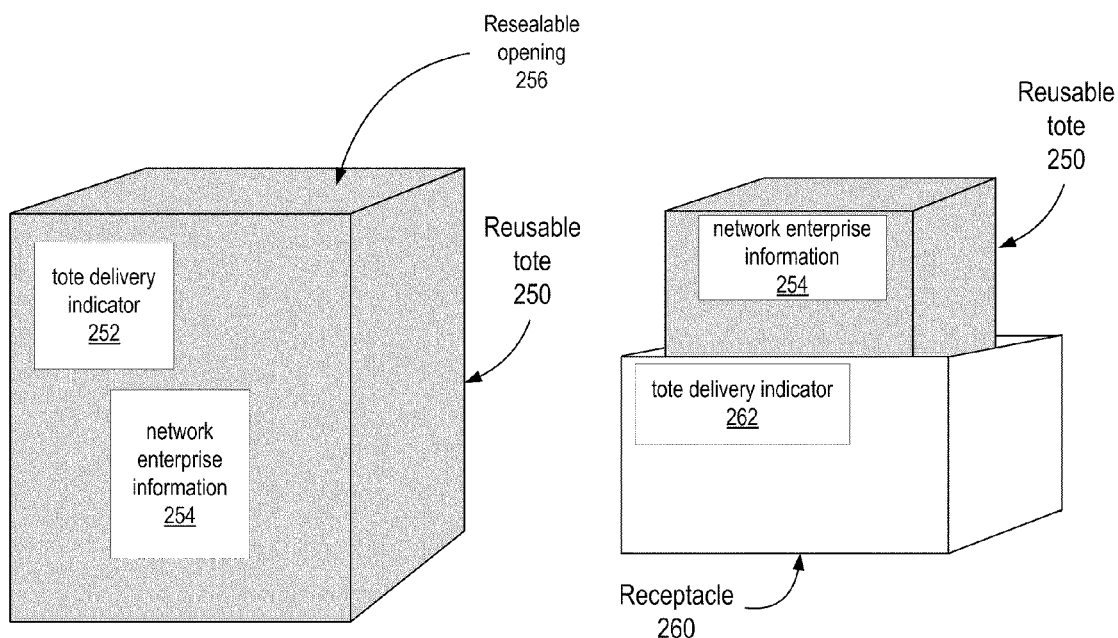
*Figure 4A*  *Figure 4B* network site navigation
402

| Tote 404 | Cart 406 |

What is the Tote Delivery Service?
A FREE delivery service. On your Tote day, items ordered using the tote delivery service will be delivered to your doorstep in a reusable tote. You can use the Tote Delivery Service whenever you like -- there are no minimums, no program subscription and no obligations.

1. Start your tote
- Choose the FREE Tote delivery option.
- No fees, no minimum order or commitments.
- Where is the Tote Delivery Serivce available and what can I order from it? Tote FAQs

2. Add Items
- Add items until 2 days before your delivery day.
- Check out what the tote will look like

3. Free delivery
- Your consolidated order are delivered in a free reusable Tote to your doorstep.
- A reusable tote that is yours to keep or return
- FREE returns from your doorstep

- Where is the tote delivery service available and what can I order from it? Tote FAQs
- We want to hear from you! E-mail us at <email address>
- Terms & Conditions Order by Wednesday at 8am and get your Tote on Friday.
Order Deadline ▶    *Tote Day

| Su | M | T | W | Th | F | Sa |

* Your given Tote Delivery Day is assigned based on your Zip Code

| network site navigation 402 | | Tote 404 | Cart 406 |

What is the Tote Delivery Service?
The Tote Delivery Service is a FREE weekly delivery service.
Items ordered using the tote delivery service will be delivered to your doorstep in a reusable tote, free of charge. You can use the Tote Delivery Service whenever you like – there are no minimum order sizes, obligations, or fees. <u>Learn more</u>

1. Add to your tote
- Choose the FREE Tote delivery option on the item detail page and proceed through tote checkout.
- No fees, minimum order sizes, or obligations.

2. Shop until your cutoff
- If you like, you can add items to your tote until noon 2 days before your tote delivery day.
- To view or edit your tote orders, visit your <u>tote management page</u>

3. Free delivery
- Your items are delivered in a sealed, weather-resistant tote once a week, or twice a week if you qualify.
- Keep your tote, or leave it on your doorstep for pickup.
- Return items free of charge from your doorstep

- Check on your <u>tote orders</u>
- Questions? See <u>Tote FAQs</u>
- Send us your feedback. E-mail us at <email address>

Delivery information:
Sign in to view your assigned tote day:

E-mail address: <email address>

Password: <password>

Sign in 512

510

*Figure 9B* network site navigation
402

Tote 404   Cart 406

- Check on your tote orders
- Questions? See Tote FAQs
- Send us your feedback. E-mail us at <email address>

Delivery information:
Order by 8am Monday and get your Tote on Wednesday.

Order Deadline ▶ Su  M  T  W  Th  F  Sa
                        *Tote Day

* Your Tote Delivery Day is assigned based on your Zip Code

What is the Tote Delivery Service?
The Tote Delivery Service is a FREE weekly delivery service. Items ordered using the tote delivery service will be delivered to your doorstep in a reusable tote, free of charge. You can use the Tote Delivery Service whenever you like – there are no minimum order sizes, obligations, or fees. <u>Learn more</u>

1. Add to your tote
- Choose the FREE Tote delivery option on the item detail page and proceed through tote checkout.
- No fees, minimum order sizes, or obligations.

2. Shop until your cutoff
- If you like, you can add items to your tote until 8am 2 days before your tote delivery day.
- To view or edit your tote orders, visit your <u>tote management page</u>

3. Free delivery
- Your items are delivered in a sealed, weather-resistant tote once a week.
- Keep your tote, or leave it on your doorstep for pickup.
- Return items free of charge from your doorstep

520

*Figure 9C* network site navigation
402

[ Tote 404 ]  [ Cart 406 ]

What is the Tote Delivery Service?
The Tote Delivery Service is a FREE weekly delivery service. Items ordered using the tote delivery service will be delivered to your doorstep in a reusable tote, free of charge. You can use the Tote Delivery Service whenever you like – there are no minimum order sizes, obligations, or fees. Learn more

1. Add to your tote
- Choose the FREE Tote delivery option on the item detail page and proceed through tote checkout.
- No fees, minimum order sizes, or obligations.

2. Shop until your cutoff
- If you like, you can add items to your tote until 10am 2 days before your tote delivery day.
- To view or edit your tote orders, visit your tote management page

3. Free delivery
- Your items are delivered in a sealed, weather-resistant tote twice a week.
- Keep your tote, or leave it on your doorstep for pickup.
- Return items free of charge from your doorstep

- Check on your tote orders
- Questions? See Tote FAQs
- Send us your feedback. E-mail us at <email address>

Delivery information:
Order by 10am Monday and get your Tote on Wednesday OR order by 10am on Thursday and get your Tote on Saturday Order Deadline → [ Su | M | T | W* | Th | F | Sa* ]
  *Tote Day   *Tote Day
  Order Deadline →

*Your Tote Delivery Days are assigned based on your Zip Code

```
                              network site navigation        Tote    Cart
                                      402                    404     406
Tote delivery service sign in
                                                                        610

Email address:   <email address>
   Do you have a password?
        ○  No, new customer
        ●  Yes:   <password>
              Sign in
                612
```

```
                              network site navigation        Tote    Cart
                                      402                    404     406
Confirm that you want to add this item to your tote order
┌─────────────────────────────────┬──────────────────────────┬─────────────────────────┐
│ Choose shipping address and      │ Payment and billing 730  │ Tote Order Summary      │
│ tote delivery day 710            │                          │         740             │
│                                  │ Payment type:            │                         │
│ ◉ <delivery day 1> <Shipping     │   <payment type>  edit   │ Items (2):   <amount>   │
│    address 1>                    │                          │ Shipping:    <free>     │
│                                  │ Billing address          │ -----------             │
│                                  │   <billing address> edit │ Total before tax: <amount> │
│ ● <delivery day 2> <Shipping     │                          │ Estimated tax:   <tax>  │
│    address 2>                    │                          │                         │
│                                  │                          │ Total cost:  <total cost> │
│                                  │                          │                         │
│                                  │                          │   Add to tote order     │
│                                  │                          │         742             │
│                                  │                          │        Cancel           │
└─────────────────────────────────┴──────────────────────────┴─────────────────────────┘
Item(s) in your tote order:                                                         720
   Item 1   <Item description, price, quantity>   Change
   Item 2   <Item description, price, quantity>   Change
```

|  | network site navigation 402 | Tote 404 | Cart 406 |

Thank you, your tote order has been placed!

An email confirmation has been sent for your tote order number <order number>.
Your <items> will be delivered on <tote delivery day> in a reusable tote.

Review or edit your tote orders

Continue shopping
810

812

Tote Order Summary 840

Tote order #:   <order number>
Delivery address: <address>
Tote delivery day: <tote delivery day>
Items:   <item list>
Total cost:   <total cost>

Item recommendations: 820

Item A   <Item description, price>    Item B   <Item description, price>    . . .

```
┌─────────────────────────────────────────────────────────┐
│ Items for tote delivery in a given city on a given      │
│ delivery day are bulk-picked in one or more fulfillment │
│ centers                                                 │
│ 1400                                                    │
└─────────────────────────────────────────────────────────┘
                            │
                            ▼
┌─────────────────────────────────────────────────────────┐
│ The bulk-picked items are bulk transferred to a         │
│ sortation node for the city                             │
│ 1402                                                    │
└─────────────────────────────────────────────────────────┘
                            │
                            ▼
┌─────────────────────────────────────────────────────────┐
│ The bulk-picked items are rebinned into customer totes  │
│ at the sortation node                                   │
│ 1404                                                    │
└─────────────────────────────────────────────────────────┘
                            │
                            ▼
┌─────────────────────────────────────────────────────────┐
│ Customer totes are loaded onto delivery vehicle(s) at   │
│ the sortation node                                      │
│ 1406                                                    │
└─────────────────────────────────────────────────────────┘
                            │
                            ▼
┌─────────────────────────────────────────────────────────┐
│ Customer totes are delivered to respective customer     │
│ addresses                                               │
│ 1408                                                    │
└─────────────────────────────────────────────────────────┘
                            │
                            ▼
┌─────────────────────────────────────────────────────────┐
│ Empty totes and totes including returned items are      │
│ retrieved and returned to the sortation node            │
│ 1410                                                    │
└─────────────────────────────────────────────────────────┘
```

*Figure 19*

METHODS AND APPARATUS FOR FULFILLING TOTE DELIVERIES

BACKGROUND

Manufacturers, retailers, wholesalers, distribution centers, and other distributors of product or goods (which may collectively be referred to as distributors) typically maintain an inventory of various items that may be ordered by and shipped to clients or customers. This inventory may be maintained and processed at a materials handling facility or facilities such as distribution centers, cross-docking facilities, and order fulfillment facilities. FIG. 1 illustrates a broad view of the operations of a conventional distributor. Multiple customers 10 may submit orders 20 to the distributor, where each order 20 specifies one or more items from inventory 30 to be shipped to the customer that submitted the order. At order fulfillment 40, the orders may be separately processed by the enterprise to fulfill the customer orders 20. The one or more items specified in each order may be retrieved or "picked" from inventory 30 in the materials handling facility. The picked orders may then be packed and shipped 50 to the customers 10. Note that a shipped order does not necessarily include all of the items ordered by the customer; a shipped order may include only a subset of the ordered items available to ship at one time from one inventory-storing location. Typically, the customer is billed for the items(s) in the order and for charges related to shipping the order to the customer.

The increasing scope of network-based commerce, fueled by the ubiquity of personal computers, the Internet, and the World Wide Web, has resulted in striking changes to the ways customers may shop for and purchase products from distributors. Virtual storefronts, which may be referred to as network sites or web sites, in which customers may view product information including features, specifications, appearance, pricing, availability, have become commonplace even among wholesalers and retailers who have maintained physical customer presences (e.g., "brick-and-mortar" storefronts). Much commerce is already being conducted exclusively through network sites by product distributors lacking any other customer presence. Electronic commerce using virtual storefronts may offer many advantages, such as lower cost overhead (e.g., due to lack of sales personnel, lack of physical storefronts, highly automated ordering processes, etc.), and a potential customer base limited only by the reach of the Internet. A product distributor that provides a "storefront" for customers exclusively through a network site, or the portion of a product distributor that provides a network site for customers while the distributor maintains physical customer presences, may be referred to as a network enterprise.

FIG. 2 illustrates an example conventional network enterprise that provides a "virtual storefront" to customers via a network site. Multiple customers 110, through access to the Internet 100, may order one or more items from the network enterprise 102 via a network site 104 serving as a "virtual storefront" for the product distributor. The network site 104 may generate orders 120 for the customers, where each order 20 specifies one or more items from inventory 130 to be shipped to the customer that submitted the order. The orders may be processed 140 by the product distributor to fulfill the customer orders 120. The one or more items specified in each order may be retrieved or "picked" from inventory 130 in a materials handling facility. The picked orders may then be packed and shipped 150 to the customers 110. Typically, each individual customer order is separately picked, sorted, packed, and shipped. Typically, the customer is separately billed 106 for the items(s) in each separate order and for charges related to shipping each order to the customer.

In conventional order fulfillment systems, the items in an order are generally packed and shipped in cardboard boxes, shipping envelopes, or other such shipping materials, and often contain filler materials such as Styrofoam "peanuts" or bubble wrap. After receiving an order, the customer must open the package(s) and dispose of the packaging, for example by breaking down and disposing of the boxes, throwing away the filler materials, and so on.

BRIEF DESCRIPTION OF THE DRAWINGS

FIG. 3 is a high-level flowchart of a method for implementing a tote delivery service according to at least some embodiments.

FIG. 4A illustrates an example reusable tote according to at least some embodiments.

FIG. 4B illustrates a tote placed in a receptacle for tote delivery according to at least some embodiments.

FIGS. 9A through 9D illustrates example web pages that provide information about example embodiments of the tote delivery service, according to some embodiments.

FIG. 10 illustrates an example web page via which a customer may sign in to the tote delivery service, according to some embodiments.

FIG. 11 illustrates an example web page via which a customer may confirm that an item is to be placed in a pending tote order, according to some embodiments.

FIG. 12 illustrates an example web page that confirms that a tote order has been placed by the customer, according to some embodiments.

FIG. 19 is a flowchart of back end operations for a tote delivery service, according to at least some embodiments.

Figure 1:
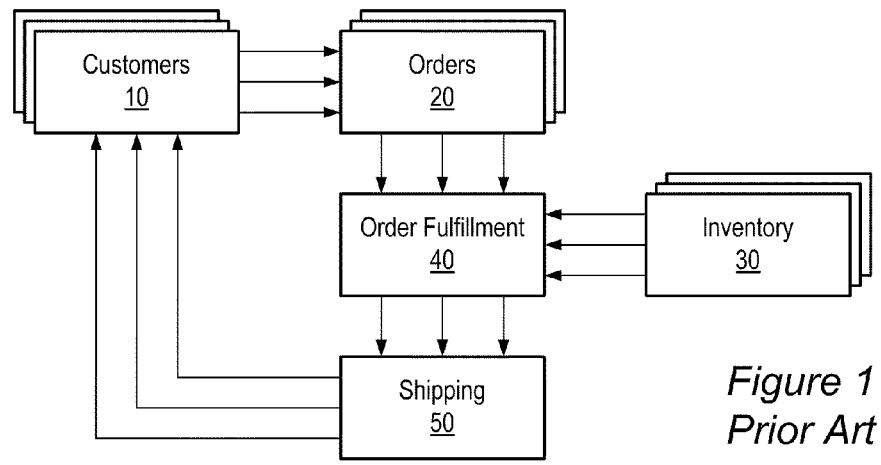
FIG. 1 illustrates a broad view of the operation of a conventional distributor.
Figure 2:
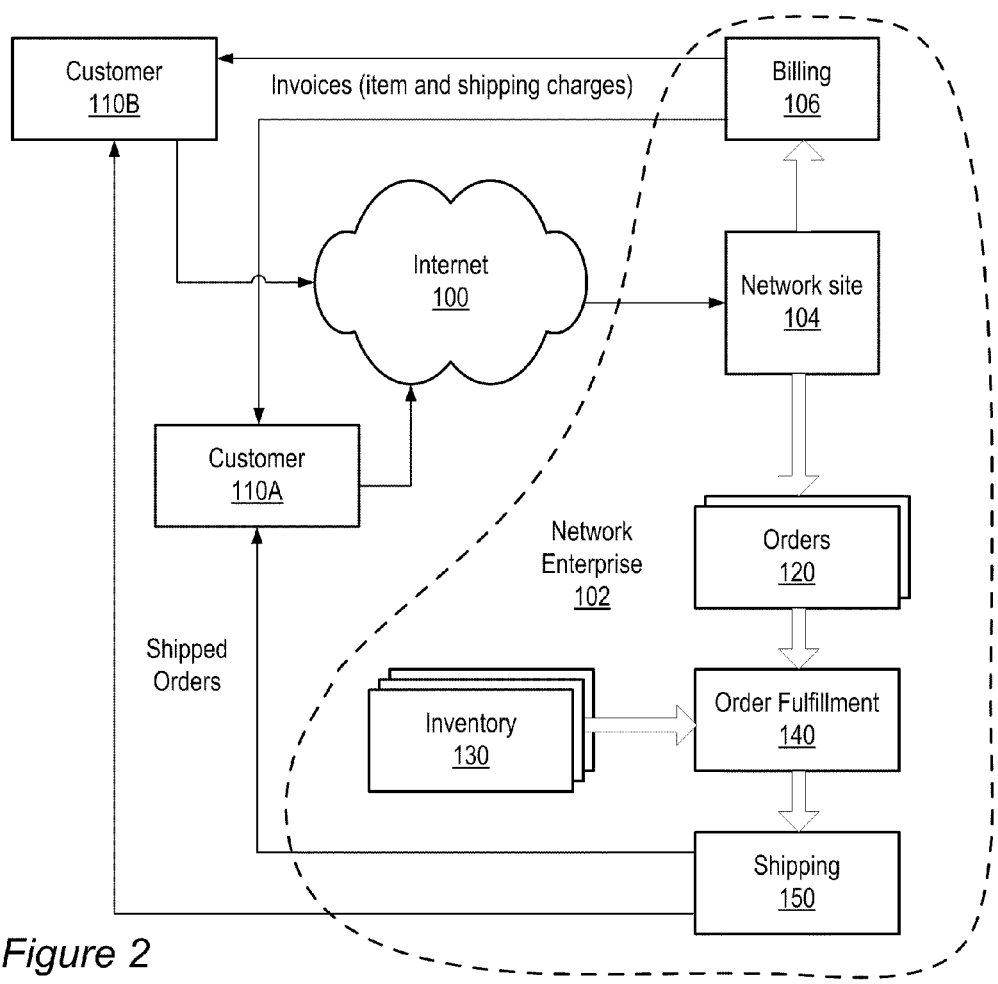
FIG. 2 illustrates an example conventional network enterprise that provides a "virtual storefront" to customers via a network site.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for product ordering and delivery that provide consolidated customer deliveries of items ordered via a network site are described. The methods and apparatus for product ordering and delivery may use reusable totes to deliver items ordered from a network enterprise to customers' delivery addresses. The methods and apparatus may collectively be referred to as a tote delivery service. Instead of sending customers separate boxed or otherwise packaged shipments for each order they place via the network site, embodiments of the tote delivery service may allow customers of a network enterprise to easily consolidate their orders into standing periodic (e.g., weekly or bi-weekly) deliveries in reusable containers, which may be referred to as totes. In at least some embodiments, the reusable totes may be returned to the network enterprise for reuse. In at least some embodiments, the reusable totes may be kept by the customers.

In an example implementation of the tote delivery service by a network enterprise, the tote delivery service may be promoted as a free, fast, and "green" delivery program for at least some items that uses reusable totes and that thus reduces or eliminates the delivery of individual orders in cardboard boxes or other packaging materials that require breaking down, recycling, or trashing by the customer. In at least some embodiments, customers may be required to have an account with the network enterprise to use the tote delivery service. In some embodiments, the customers may be required to sign up for or subscribe to the tote delivery service to place orders to be delivered by tote. In other embodiments, the customers may not be required to sign up for or subscribe to the tote delivery service; the tote delivery service may be made available to some or all customers of the network enterprise without requiring the customers to specifically subscribe to receive the service. In at least some embodiments, customers may be required to sign in (e.g., by entering a password) to use the tote delivery service when placing an item in a tote order.

In some embodiments, each customer is assigned a pre-defined tote delivery day according to a zone that the customer's delivery address is in, where each zone corresponds to a day of the week (e.g., Monday, Tuesday, Wednesday, etc.) on which deliveries are made to that zone. The zones may, for example, be based on the zip codes of the delivery addresses. Thus, in at least some embodiments, a customer may provide a delivery address (or just a zip code) to view the customer's corresponding tote delivery day, or the customer's tote delivery day may automatically be displayed for the customer on a user interface based on the customer's delivery address. Note that two or more zones may have the same day of the week as the zone delivery day, and that some zones, or at least some customers in at least some zones, may have more than one delivery day in a week. Furthermore, a customer may have more than one delivery address, and thus may have more than one tote delivery day. In some embodiments, instead of assigning pre-defined tote delivery days to all customers, at least some customers may be allowed to select a preferred tote delivery day or delivery days, possibly with some restrictions (e.g., a customer may pick between Monday and Friday). In some embodiments, at least some customers may be provided with multiple, for example two, tote delivery days per week (e.g., Tuesday and Friday) to a given delivery address. For example, some customers may be members in a subscription-based shipping program in which the customer pays a fixed periodic fee that covers all regular conventional shipping costs for that period, and/or that provides reduced shipping costs for that period; these customers may be given two tote delivery days per week, instead of one tote delivery day per week, as an added benefit of being members of the subscription-based shipping program.

After a customer signs up for the tote delivery service, tote delivery may be presented as an option on at least some item detail pages of the network site user interface for the customer, for example as a single-action user interface element (e.g., a button). In addition, tote delivery may be presented as an option in the order pipeline user interface. Other shipping options, for example a next-day shipping option and a two-day shipping option, may also be presented to the customer on these or other web pages of the network site. In some embodiments, any eligible item offered via the network site may be added by a customer to the customer's virtual tote up to a specified cutoff (e.g., two days) before the customer's tote delivery day (or days). In some embodiments, the cutoff may be firm; in other words, the customer must order an item for tote delivery prior to the cutoff for a given tote delivery in order for the item to be included in the customer's tote order for that delivery. In some embodiments, the cutoff may be flexible for at least some customers and for at least some items; that is, an item ordered for tote delivery after the cutoff for a given tote delivery may be included in the customer's tote order for that delivery if possible. Some items offered via the network site may not be eligible for tote delivery; for example, some items may be too large or too heavy for tote delivery. Other types of shipments may be seamlessly delivered to customers via the tote delivery service. In some embodiments, rental items, such as video games, DVDs, Blu-Ray discs, tools, and so on, may be delivered via the tote delivery service. In some embodiments, the customer may choose, via the user interface, to have pre-ordered items and back-ordered items delivered via the tote delivery service. The network site system may automatically add these pre-ordered items and back-ordered items to a soonest feasible tote delivery day, if the customer so chooses.

At least some network enterprises may not necessarily need to create new order fulfillment facilities to offer the tote delivery service; the tote delivery service may be integrated into existing facilities. However, at least some network enterprises may need to add sortation node and tote delivery capabilities into their existing order fulfillment network. In some implementations of the tote delivery service, inventory may reside in the order fulfillment network as in conventional order fulfillment networks. In some embodiments, under direction of the network enterprise logic, at least some items ordered to be delivered via the tote delivery service by customers in a given city may be bulk picked at one or more fulfillment centers in the order fulfillment network and bulk transferred within the order fulfillment network to sortation nodes that manage deliveries for respective cities or regions. A bulk pick for and bulk transfer to a particular sortation node may be performed one or more times in a given day at a given fulfillment center, but are not necessarily performed every day. Also note that items bulk picked on a given day are not necessarily bulk transferred on the same day. In some embodiments, in addition to bulk transferring items from fulfillment centers in the order fulfillment network to a sortation node, some items may be transferred directly from one or more vendors to a sortation node under direction of the network enterprise logic to fulfill tote delivery service deliveries.

The sortation nodes may be implemented in fulfillment centers, smaller, forward-deployed fulfillment centers, or even as stand-alone "delivery depots." A sortation node may be a node in the network enterprise's order fulfillment network that is owned and operated by the network enterprise. Alternatively, a sortation node may be owned and/or operated by another entity, such as a local carrier or delivery company that owns and/or operates the tote delivery vehicles. At each sortation node, the bulk-picked items, received in bulk transfers from one or more fulfillment centers, may be rebinned into customer totes, which may in some embodiments be on rolling racks pre-assigned to specific zip codes. On (or before) the scheduled tote delivery day, the totes for that tote delivery day may be loaded onto appropriate delivery vehicles for delivery. For example, the racks of totes for that tote delivery day may be rolled onto the appropriate delivery vehicles for delivery. Each of one or more delivery zones served by the sortation node (e.g., each zip code) may be given a common day-of-week promise (e.g., "delivered Wednesdays before 6 pm"), ensuring high delivery densities on each route; different ones of the zones served by a sortation node may be given different tote delivery days. In some embodiments, one or more zones served by a sortation node may be given more than one tote delivery day per week.

At each address to which a tote order is to be delivered on a tote delivery run, the driver drops the tote or totes including items to be delivered via the tote delivery service on the tote delivery day and retrieves any return totes, which may, but do not necessarily, include returned items from the customers. In some embodiments, two or more tote delivery runs may be made to a given zone on a given tote delivery day at different time slots, for example a morning tote delivery run and an evening tote delivery run, or a "before 9 am" delivery run, a "before 1 pm" delivery run, and an "after 6 pm" delivery run. In these embodiments, individual customers may be assigned a particular time slot on a tote delivery day, or alternatively a customer may specify which time slot on the tote delivery day that the customer wants to receive the tote delivery for that day. In embodiments where the customer specifies which time slot of two or more time slots on a tote delivery day that the customer prefers, the specification may be made as a default for the customer and/or may be made on a tote-by-tote basis. For example, when the customer confirms a tote delivery, or alternatively via a tote management page, the user may be provided with an option as to which time slot the customer prefers for a tote delivery, in addition to which tote delivery day the customer wants the tote delivered on and which tote deliver address the customer wants the tote delivered to (if the customer has multiple delivery addresses).

In some embodiments, it may be required that a person be present at a tote delivery address to receive a tote order at the time the tote order is delivered for the delivery service to leave the tote(s) at the delivery address. In some embodiments, the delivery service may leave totes "on the doorstep" at unattended delivery addresses or leave totes "on the doorstep" without a person receiving the tote order directly. In some embodiments, the user interface may allow a customer to specify, for a given tote order, whether the customer will allow the tote order to be left "on the doorstep" at the delivery address without a person receiving the tote order directly, or alternatively may allow the customer to specify, for a given tote order, that the customer wants the tote order to be received by a person at the delivery address. In some embodiments, the user interface may allow the customer to specify which person(s) are allowed to receive a tote order.

From the customer perspective, embodiments of the tote delivery service may provide low-cost or free, relatively fast shipping with less cardboard and other packaging materials to throw away or recycle. In exchange for fast, low-cost or free, "greener" (more environmentally friendly) shipping, customers may choose to aggregate their orders from the network enterprise into fewer deliveries to their home or other delivery address. In addition, the tote delivery service and the user interface to the tote delivery service may provide a tote-centric view to the customer of the items the customer orders at different times from the network enterprise, rather than a shipment or order-centric view of the customer's orders as is provided by conventional systems. In conventional, order-centric systems, the customer may place orders for one or more different items at different times, with an order generated, and shipped, for each item or items ordered at a given time. In the tote delivery service, the customer may place different items, at different times, into the same tote (or into different totes). A given tote scheduled for delivery to a particular delivery address on a particular tote delivery day may be viewed (and processed, by the tote delivery service) as a single tote order, even though different items in the tote may have been placed into the tote at different times that are hours, days, weeks, or even longer apart, and even though different items in the tote may have been placed into the tote by different customers that share the same delivery address. In some embodiments, a tote order is given a single tote order number for tracking the tote order, even if the tote order includes multiple items added to the tote at different times, in different customer sessions, or by different customers. Thus, the tote delivery service may allow customers to consolidate what would be processed as many separate orders using conventional systems, each requiring separate shipping, handling, and paperwork, into a single, consolidated tote order. Note that, while a customer may be presented with a single virtual tote into which the customer places items for a given tote order, the tote order may be delivered to the customer's delivery address in one, two or more physical totes.

Figures 15, 16:
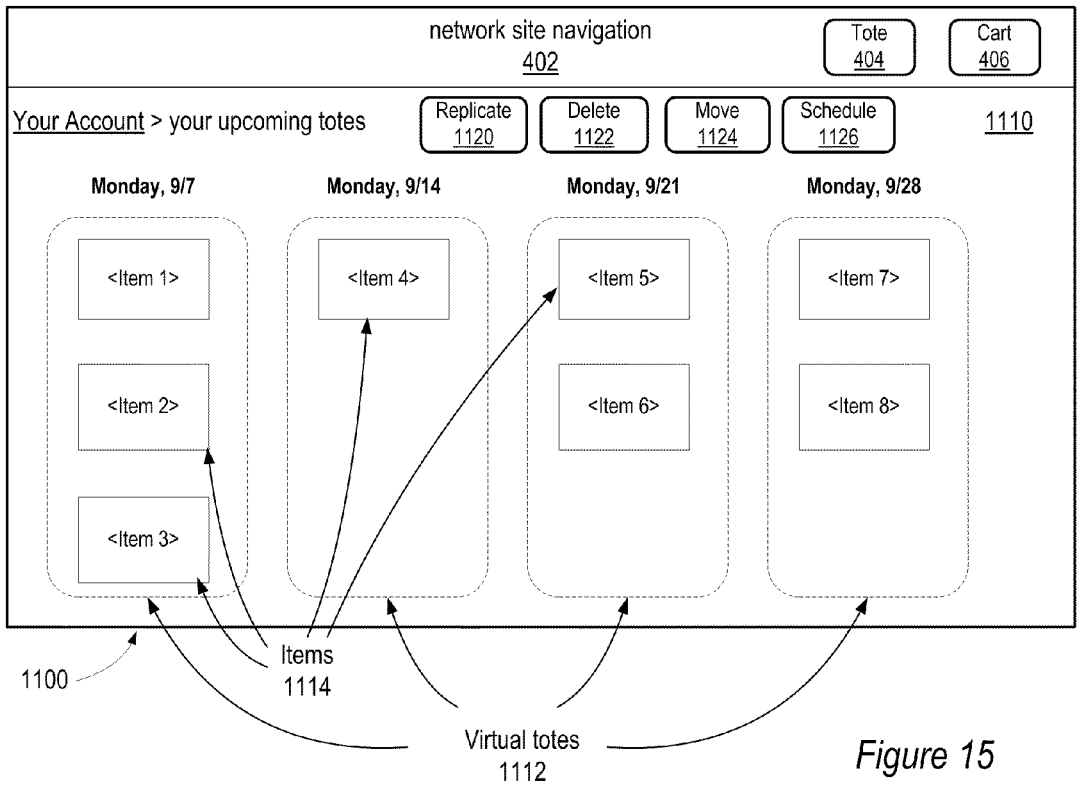
FIG. 15 illustrates an example tote management page that may be presented to a customer according to some embodiments.
FIG. 16 illustrates an example tote return page that may be presented to a customer according to some embodiments.

As an example of the tote-centric view, the customer may request that a back-ordered or pre-ordered item be delivered via the tote delivery service. The back-ordered or pre-ordered item may then be displayed in a virtual tote to be delivered on a future tote delivery day, for example on a tote management page 1100 as illustrated in FIG. 15. This may make it easier for the customer to keep track of items that the customer has ordered than in conventional, order-centric systems, as the customer can browse through future scheduled tote deliveries to view what items the customer has pending to be delivered and when the items are scheduled to be delivered via the tote delivery service, rather than the customer having to go back through past orders to try and figure out what items the customer has pending for delivery as in conventional, order-centric systems.

In addition, in some embodiments, by virtue of the use of local sortation nodes in the tote delivery service, customers may be allowed to cancel items in totes or cancel entire tote orders much later than can be done for orders being shipped by conventional shipping methods, up to the tote delivery day. For example, if a customer's scheduled tote delivery time is 6 pm, the customer may be allowed to cancel part or all of the tote order up until noon on the tote delivery day. This provides more flexibility to the customers in regards to managing and scheduling their tote deliveries than is provided by conventional ordering and shipping methods.

From the network enterprise perspective, embodiments of the tote delivery service may provide a competitively advantageous delivery option and an enterprise-wide platform for product delivery. With the possible realization of the efficiency of higher units per shipment that may result from an implementation of the product ordering and delivery method, a network enterprise may justify operating its own last-mile delivery system while offering lower-cost or even free delivery to customers via the reusable totes.

At least some embodiments of the tote delivery service may provide a user interface to a network enterprise system that enables customers to manage their tote deliveries. The tote management user interface may allow the customer to specify tote delivery for items ordered from the network enterprise. The tote management user interface may also provide a display of virtual totes scheduled for delivery on future tote delivery days. The tote management user interface may also allow customers to view their tote delivery history so that the customers can review the content of previous totes that have already been delivered. Via at least some embodiments of the tote management user interface, the customer may, for example, view what items are scheduled to be delivered in which totes, add items to particular totes to be delivered to the customer's shipping address (or shipping addresses) on particular tote delivery days, change the quantity of a particular item in a tote (e.g., specify that two of a given item are to be delivered in the tote instead of one), remove items from totes, move an item from one tote to another tote, copy an item from one tote (either a previously delivered tote or an upcoming tote) to another tote, replicate previously delivered or upcoming totes to one or more upcoming tote delivery days, and schedule periodic deliveries (e.g., monthly deliveries) of particular items to be delivered in totes. In addition, in at least some embodiments, the customer may specify, via the user interface, that back-ordered or pre-ordered items are to be delivered by tote. In some embodiments, the tote management user interface may be used to view the projected future tote shipping days for such items as scheduled delivery items, back-ordered items, and pre-ordered items. In some embodiments, the tote management user interface may allow a customer to manage a tote calendar, for example to schedule vacations or other times when the customer's tote delivery is to be temporarily suspended. Items that were previously scheduled for tote delivery during such a period may be automatically rescheduled for tote delivery after the period.

In some embodiments, a single customer may have multiple shipping addresses to which items may be delivered, and thus may, but does not necessarily have multiple scheduled delivery days, with different days for the different addresses. For example, a customer may have a home shipping address and a business shipping address, and these two addresses may be in different zip codes and thus may, but do not necessarily, have different scheduled tote delivery days. Furthermore, in some embodiments, a customer may have other people's shipping addresses listed for deliveries. For example, a customer may have his or her parents' address, his child's address, and so on. Thus, some embodiments may allow a customer to use the tote delivery service to deliver items to other people's shipping addresses, as long as the other people's addresses are listed as shipping addresses for the customer and tote delivery is available to those addresses. In some embodiments, two or more customers that share the same tote delivery address may be allowed to consolidate items that the customers separately order into a single tote order to be delivered to the shared address.

At least some embodiments of the tote delivery service may provide tote delivery as one shipping option among two or more alternative shipping options. For example, the network enterprise may provide, via the user interface, a next-day shipping option, a two-day shipping option, and a tote delivery shipping option. Providing alternative shipping options may, for example, allow the customer to receive items that are needed as soon as possible via a faster, conventional direct shipping option, while scheduling items for which the need is not so pressing for future delivery by tote on upcoming tote delivery days.

At least some embodiments of the tote delivery service may provide reusable containers (totes) that can be returned by the customer to the network enterprise for re-use. In at least some embodiments, a customer may place one or more items to be returned to the network enterprise in a tote to be returned. The user interface may provide one or more user interface elements whereby the customer can inform the network enterprise that the item(s) are being returned on a given tote delivery (and pickup) day. Using this ability to easily return items to the network enterprise in the reusable totes, at least some embodiments may enable "order bracketing" where the customer can order, for example, three pairs of the same shoe in different sizes, or three of the same item in different colors, and return the items (e.g., the pairs of shoes that don't fit, or the items that aren't the desired color) that the customer decides not to keep. In some embodiments, only items that were previously delivered via the tote delivery service may be returned via the tote delivery service. However, in some embodiments, items that are shipped according to other shipping methods may also be returned to the network enterprise via the tote delivery service. In addition, in some embodiments, other items than return items may be delivered from a customer to the network enterprise, or to other entities, via returned totes. For example, in various implementations, video game rentals, DVD/Blu-Ray Disc rentals, exchanges, items for repair, items being sent to the network enterprise for credit or resale, and so on may be delivered from a customer to the network enterprise or to some other entity via return totes and the tote delivery service. Also note that, in at least some embodiments, at least some items delivered to customers via the tote delivery service may be returned by other return methods than in return totes.

In some embodiments, return totes may be used to deliver inventory from other entities, such as merchants or sellers, to the network enterprise. For example, a merchant or seller may provide one or more different items to the network enterprise that may be placed into the network enterprise's inventory, in some cases for sale via the network site. The tote delivery service may be provided to an address of the merchant or seller. The merchant or seller may place items to be delivered to the network enterprise into a return tote that is picked up and delivered to a sortation node on a tote delivery run.

At least some embodiments of the tote delivery service may provide recommendations and reminders to the customer via the user interface to the network site and/or via alternative communications channels such as email and text messaging. The network enterprise logic may examine a customer's purchasing history and/or tote contents and, based on that examination, determine items that the customer may wish to have delivered via the tote delivery service. The network enterprise logic may then provide a recommendation to the customer to that effect. The reminders may, for example, let the customer know which tote days the customer should expect a tote to be placed on their doorstep, what the cutoff day is for placing items into (or removing items from) a given tote, and what will be delivered in the totes on those tote days. Via the recommendations and reminders, a customer may, for example, be prompted to wait for a scheduled delivery of an item via tote, or add an item to a tote, rather than making a trip to the store to pick up the item. As another example, a customer may be prompted to suggest that the customer consolidate items ordered via other shipping options (for example, items in a virtual "shopping cart") into an upcoming tote order.

At least some embodiments of the tote delivery service may implement an order fulfillment and consolidation method and system in which items from customers to be delivered on a given tote day are picked from one or more fulfillment centers and bulk-transferred to stations that are local to tote delivery zones. These stations may be referred to as sortation nodes. A sortation node receives the bulk transfers from one or more fulfillment centers and sorts the items into reusable totes according to one or more tote delivery zones scheduled for an upcoming tote delivery run. The totes for a respective tote delivery zone may then be loaded onto delivery vehicles, which then make the delivery runs to the respective tote delivery zones. The tote delivery vehicle personnel may drop off totes containing items to addresses in the respective zones, and may pick up empty totes (and totes with items to be returned, if any) from the addresses in the respective delivery zones to be returned to the sortation node. If there are any items in the returned totes, the items may be removed from the totes and either re-stocked locally or returned to an appropriate fulfillment center (e.g., in bulk return transfers) for re-stocking or other processing (e.g., return to the manufacturer). In some embodiments, items in returned totes may be otherwise processed; for example, items to be exchanged, items to be repaired, and rental items may be returned in totes, and may be removed from the totes and appropriately processed.

FIG. 3 is a high-level flowchart of a method for implementing a tote delivery service according to at least some embodiments. As indicated at 200, a customer adds one or more items to a virtual tote for a particular delivery address and a particular delivery day via a user interface to the network site. The customer, via the user interface, may effectively place one or more items offered through the network site in the virtual tote to be delivered as a consolidated tote order to a specified address on an indicated tote delivery day (e.g., Monday, Tuesday, Wednesday, etc.) for a tote delivery zone (e.g., determined by zip code) that includes the specified address. The customer may subsequently add other items to the virtual tote, change the quantity of a given item in a tote, or remove items from the virtual tote, up to the cutoff time for the respective tote delivery day. In at least some embodiments, a customer may generate a tote order for a given tote delivery day by other methods, for example by duplicating another tote or by scheduling regular, recurring tote deliveries. FIGS. 8 through 16 illustrate examples of various user interface screens and user interface elements that may be provided to customers in at least some embodiments and that allow the customers to add items to totes, manage totes, and perform other functions related to the tote delivery service.

Figure 18:
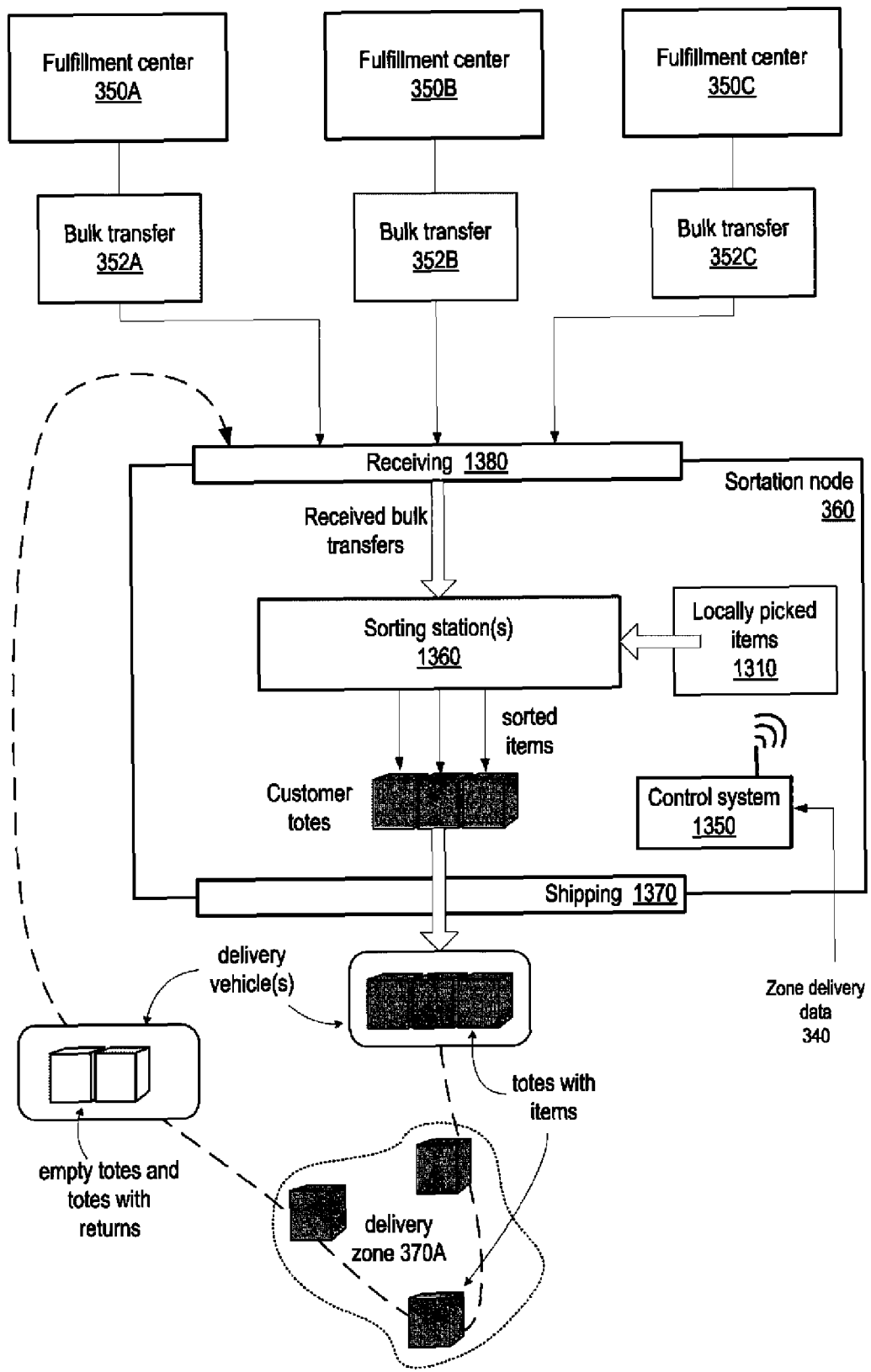
FIG. 18 illustrates operations of an example tote delivery service sortation node, according to some embodiments.

As indicated at 202 of FIG. 3, the one or more items in the tote order are placed into a physical, reusable tote at a respective sortation node prior to the delivery run to the customer's delivery zone on the given tote delivery day. In some cases, a tote order may require two or more physical totes to hold all of the items in the order. Prior to the scheduled tote delivery, the items that the customer has specified for delivery on the customer's tote delivery day may be picked (along with items ordered by other customers) and, at the sortation node, sorted into a tote or totes to be delivered to the customer's specified address. FIG. 4A illustrates an example reusable tote according to at least some embodiments. FIG. 18 illustrates operations of an example sortation node, according to at least some embodiments.

As indicated at 204 of FIG. 3, the customer's tote(s) may then be loaded onto a delivery vehicle at the sortation node, along with other totes to be delivered to other addresses in the tote delivery zone. As indicated at 206, the customer's tote(s) is delivered to and dropped off at the specified customer address on the tote delivery day for the tote delivery zone. The customer (or someone else at the address) may then retrieve the tote(s), remove the item(s) from the tote(s), and place the empty tote(s) in an appropriate location (e.g., "on the doorstep") to be picked up on a subsequent tote delivery day for that tote delivery zone. In at least some embodiments, if the customer has an item or items to be returned to the network enterprise, the customer may place the item or items in a tote to be picked up, and place the tote in an appropriate location for pickup on a subsequent tote delivery day. At least some embodiments may provide one or more methods whereby the customer may inform the network enterprise that the item(s) are being returned by tote.

FIG. 4A illustrates an example physical, reusable tote according to at least some embodiments. The reusable tote 250 shown in this Figure is given as an example, and is not intended to be limiting. In some embodiments, each customer, or each customer address, may have at least one permanently or semi-permanently assigned tote 250. In other embodiments, any randomly selected tote 250 may be temporarily assigned to delivery addresses at the sortation nodes, e.g. for one delivery run. Various sizes, shapes, materials, colors, and configurations of totes are possible and contemplated. A tote 250 may be a rectangular box with substantially rigid sides, a bag with substantially flexible sides, or some other configuration. A tote 250 may be composed at least in part of a substantially durable material or materials to facilitate reuse. In some embodiments, the tote may be composed of a weather-resistant material or materials. Any appropriate substantially durable and/or weather-resistant material (e.g., plastic, metal, cloth, durable cardboard, etc.) may be used. At least some of the material(s) of which the tote 250 is composed may be recyclable so that damaged or worn-out totes 250 may be recycled. A tote 250 may be a solid color or patterned; any desired color or color palette may be used. A tote 250 may provide a resealable opening or "lid" 256 via which items may be placed into and removed from the tote 250. In some embodiments, the lid 256 may be lockable or otherwise securable. A tote 250 may include one or more handles (not shown) via which the tote 250 may be picked up and carried.

A tote 250 may include a logo and/or other information 254, displayed on or attached to one or more surfaces of the tote, identifying or related to the network enterprise and/or the tote delivery service, such as a name, telephone number, web address, email address, instructions, return policies, and so on. In some embodiments, a tote 250 may include other identifying information or marks, such as information identifying a zone that the tote 250 is delivered to, or information identifying a particular sortation node that the tote 250 belongs to. In some embodiments, a tote 250 may include or display one or more advertisements for the network service or for other entities (e.g., the network service or tote delivery service may sell advertising space on the totes to other entities). While FIG. 4A shows information 254 as being displayed on at least one outside surface of the tote 250, in some embodiments, at least a portion of information 254 may be displayed on or attached to at least one inside surface of the tote 250 rather than, or in addition to, being displayed on or attached to the outside surface.

A tote 250 may, but does not necessarily, include a tote delivery indicator 252 that may identify at least a delivery address for the particular tote 250 to the delivery personnel and/or to sortation node personnel or automated sorting devices. Tote delivery indicator 252 may, for example, be a printed label that is permanently affixed to the tote 250, or a removable printed label. While FIG. 4A shows tote delivery indicator 252 as being attached to an outside surface of tote 250, in some embodiments, tote delivery indicator 252 may be otherwise attached. For example, in some embodiments, tote delivery indicator 252 may be a tag that may be attached to and removed from the tote; for example, the tag may be similar to a luggage tag that can be attached to a handle of tote 250. In some embodiments, tote delivery indicator 252 may be a radio-frequency identification (RFID) tag, or other type of electronic tag, that delivery personnel and/or sortation node personnel or automated sorting devices may scan, e.g. using a hand-held scanner, to identify at least the delivery address for the tote 250. In some embodiments, an electronic tag may be programmable at the sortation node so that the delivery address (or other information) indicated by the tag on a given tote 250 may be changed at the sortation node if and when necessary. In some embodiments, tote delivery indicator 252 may include or may be a bar code that may be programmed to indicate the particular tote delivery and that may be scanned by tote delivery personnel and/or sortation node personnel or automated sorting devices.

In some embodiments, totes 250 do not include an indicator 252. For example, as illustrated in FIG. 4B, in some embodiments, totes 250 may be placed into receptacles 260, such as open-top bins, at a sortation node, and the receptacles, including the totes 250, may be loaded into delivery vehicles. Instead of using indicators 252 on the totes 250, the receptacles 260 into which the totes 250 are placed may each include a tote delivery indicator 262 similar to tote delivery indicator 252 that may be used by tote delivery personnel to determine the delivery address for the tote(s) 250 contained therein. At a delivery address, the delivery personnel identifies the corresponding receptacle 260 for that address, removes the tote 250 or totes 250 from the receptacle 260, and drops off the tote(s) 250.

In some embodiments, the reusable totes 250 may be returned to the network enterprise for reuse. In some embodiments, the reusable totes 250 may be kept by the customers. In some embodiments, the customers may either return or keep a tote 250. In some embodiments, at least some customers may be charged a nominal fee or deposit for each tote 250. In some embodiments, this tote fee or deposit may be refunded to the customer upon return of a tote 250.

In some embodiments, the network enterprise may provide special or different tote bags to at least some customers. For example, seasonal totes and/or holiday totes that are patterned, colored, or otherwise decorated to indicate a season, holiday, or other occasion may be provided. As another example, the network enterprise may provide a "giftwrap" service via which totes may be gift wrapped or otherwise decorated for delivery upon a customer's request, possibly for a fee. As another example, the network enterprise may provide deluxe totes to some customers, possibly for an upgrade fee. As another example, in some embodiments, customers that are members in a subscription-based shipping program may be provided with different totes than those provided to non-subscribed customers.

Figure 5:
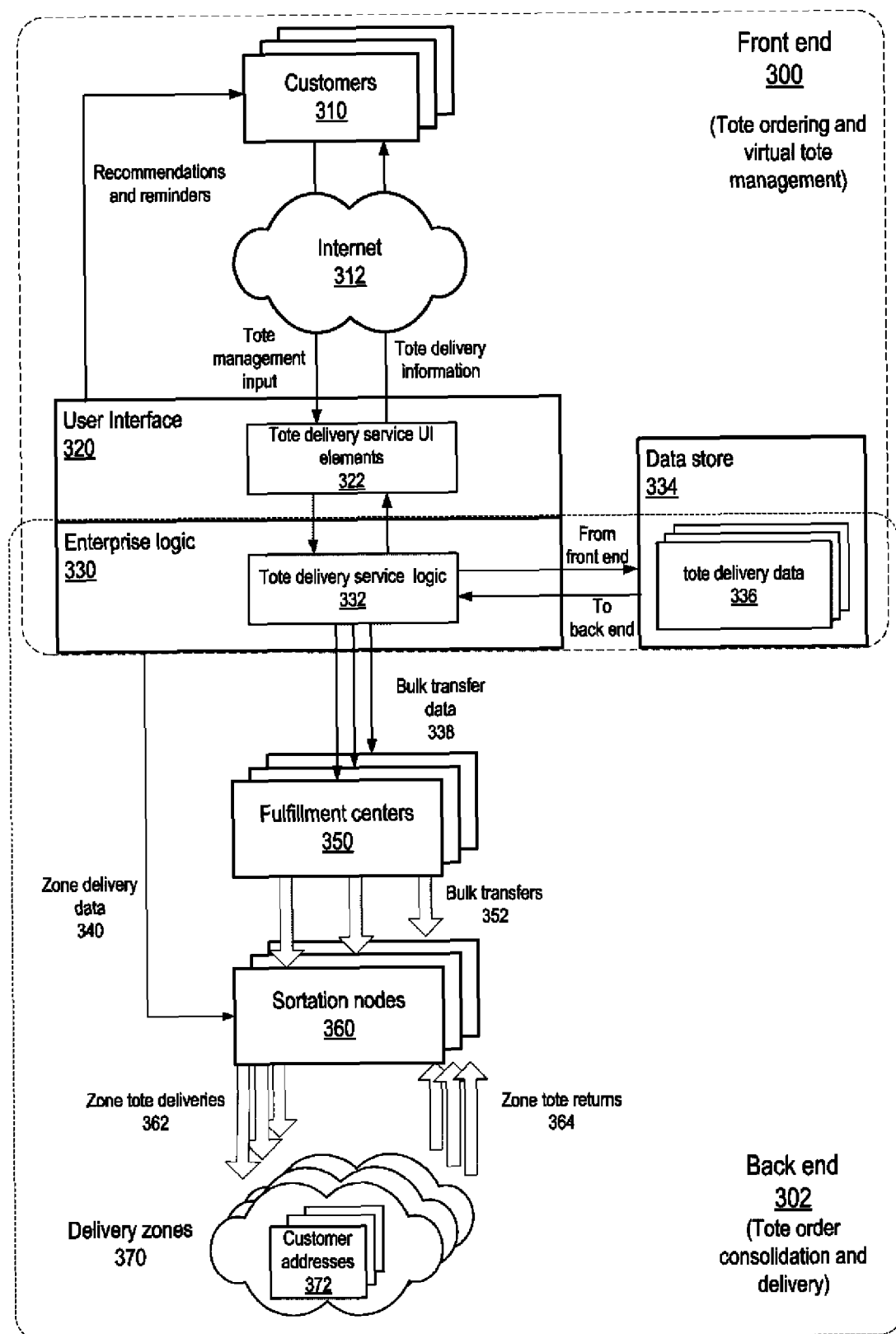
FIG. 5 is a block diagram of an example tote delivery service according to at least some embodiments.

FIG. 5 is a block diagram of an example tote delivery service according to at least some embodiments. This Figure shows both data flow and product flow within an example tote delivery service. The tote delivery service may be viewed as comprising two major components or subsystems—a front end 300 that provides tote ordering and virtual tote management to customers via a user interface 320 to network enterprise logic 330, and a back end 302 that provides tote order consolidation and delivery to customers under the direction of network enterprise logic 330. In at least some embodiments, the back end 302 may also provide a return service via the tote delivery service whereby customers may return or deliver items to the network service or to other entities, including methods for refunding customers for items returned in totes, providing credit for used items delivered via return tote for resale, and so on.

Figure 20:
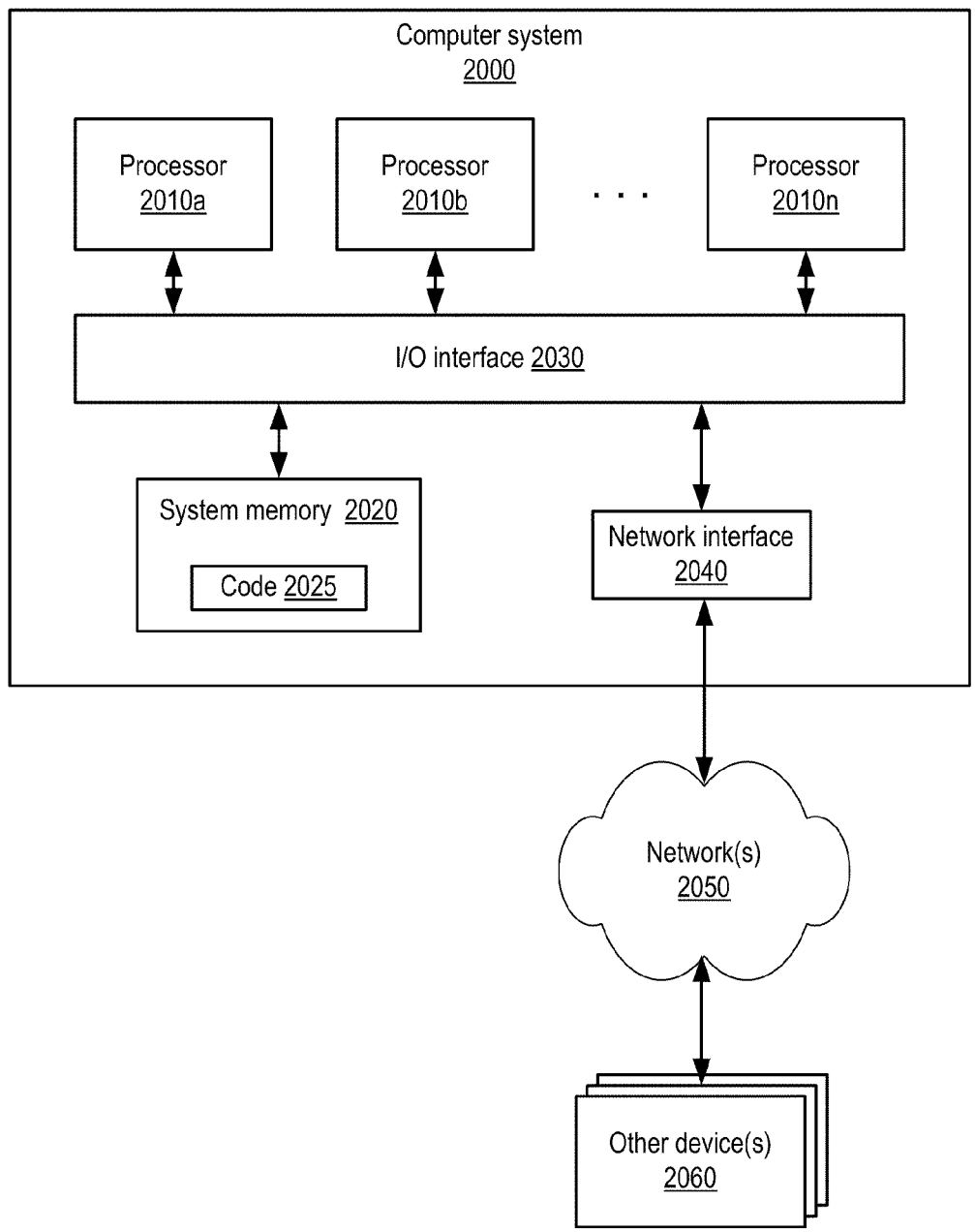
FIG. 20 is a block diagram illustrating an example computer system that may be used in at least some embodiments.

Network enterprise logic 330 may be implemented on one or more computer systems, such as server computers. FIG. 20 illustrates an example computer system that may be used to implement enterprise logic 330 or components thereof. Referring to FIG. 5, enterprise logic 330 may store tote delivery data 336 in a data store 334. Tote delivery data 336 may include, but is not limited to, records of items previously delivered to particular customers via the tote delivery service and records of items to be delivered to particular customers via the tote delivery service. Data store 334 may also store other information that may be used by the network enterprise logic during front end and/or back end operations, including one or more of, but not limited to, product information that describes the items that the network enterprise offers for sale, order information for other types of orders than tote delivery orders, inventory information that indicates the quantities and locations of the network enterprise's inventory within the order fulfillment network, user interface elements such as web pages, and customer account information that includes customers' names, addresses, billing information, and so on. Data store 334 may be implemented as or on one or more storage devices configured independently or as a storage system. In general, data store 334 may be implemented as one or more of any type of storage device and/or storage system suitable for storing data used by the server systems that implement the network enterprise logic 330 including, but not limited to: redundant array of inexpensive disks (RAID) devices, disk drives or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof.

Tote delivery information 336 may, for example, be stored as or in a database. The database may be implemented as a single, monolithic database or as a combination of two or more databases and/or data stored in other, non-database formats, such as files stored in any of various file formats. The database may be or may include a relational database, or may be or may include any other type of database, such as an object oriented database, depending on implementation, or combinations thereof. In at least some embodiments, the database may include a customer database configured for storing information about customers that have accounts for accessing the network site. In some embodiments, the database may include a subscription database for storing information about customers that have subscribed to a subscription-based shipping program.

In front end 300 operations, the user interface 320 may present tote delivery user interface (UI) elements to customers 310 via internet 312, for example via web browser software on the customers' computing devices. The customers' computing devices may include desktop computers, notebook computers, mobile devices such as cell phones or smart phones, television web platforms, or any other device capable of displaying the user interface 320. Tote delivery service UI elements 322 may include both control elements (e.g., buttons, menus, text boxes, radio buttons, etc.) via which the customers 310 can provide input to the enterprise logic 330 to manage their tote deliveries, and display elements that display tote delivery information. Tote delivery service logic 332 of enterprise logic 330 may present tote delivery information to the customers 310 via tote delivery service UI elements 322 of the user interface 320. Tote delivery service logic 332 of enterprise logic 330 may also receive tote management input (e.g., customers 310 orders for items to be delivered via the tote delivery service, customers 310 modifications of the contents of scheduled tote deliveries, etc.) via user tote delivery service UI elements 322 of user interface 320. Enterprise logic 330 may process this tote management input to appropriately modify tote delivery data 336.

In at least some embodiments, user interface 320 may also provide recommendations and reminders regarding the tote delivery service to customers 310, via the network site over Internet 312 or via alternative communications channels such as email and text messaging. To generate recommendations and/or reminders, enterprise logic 330 may examine enterprise data in data store 334, including but not limited to tote delivery data 336. For example, enterprise logic 330 may examine a customer's tote delivery history to determine that the customer periodically orders a particular item, and then send a recommendation to the customer via user interface 320 recommending that the item be scheduled for regular tote delivery. As an example of a reminder, enterprise logic 330 may examine a customer's upcoming tote orders to generate and send reminders of one or more upcoming tote deliveries. In some embodiments, other information than the enterprise data stored in data store 334 may be obtained and analyzed to generate recommendations. For example, data indicating consumer purchasing patterns or other consumer metrics may be obtained from one or more other external sources, such as other consumer goods enterprises, consumer product providers, and/or consumer research entities, and used in generating recommendations for customers.

Figure 17:
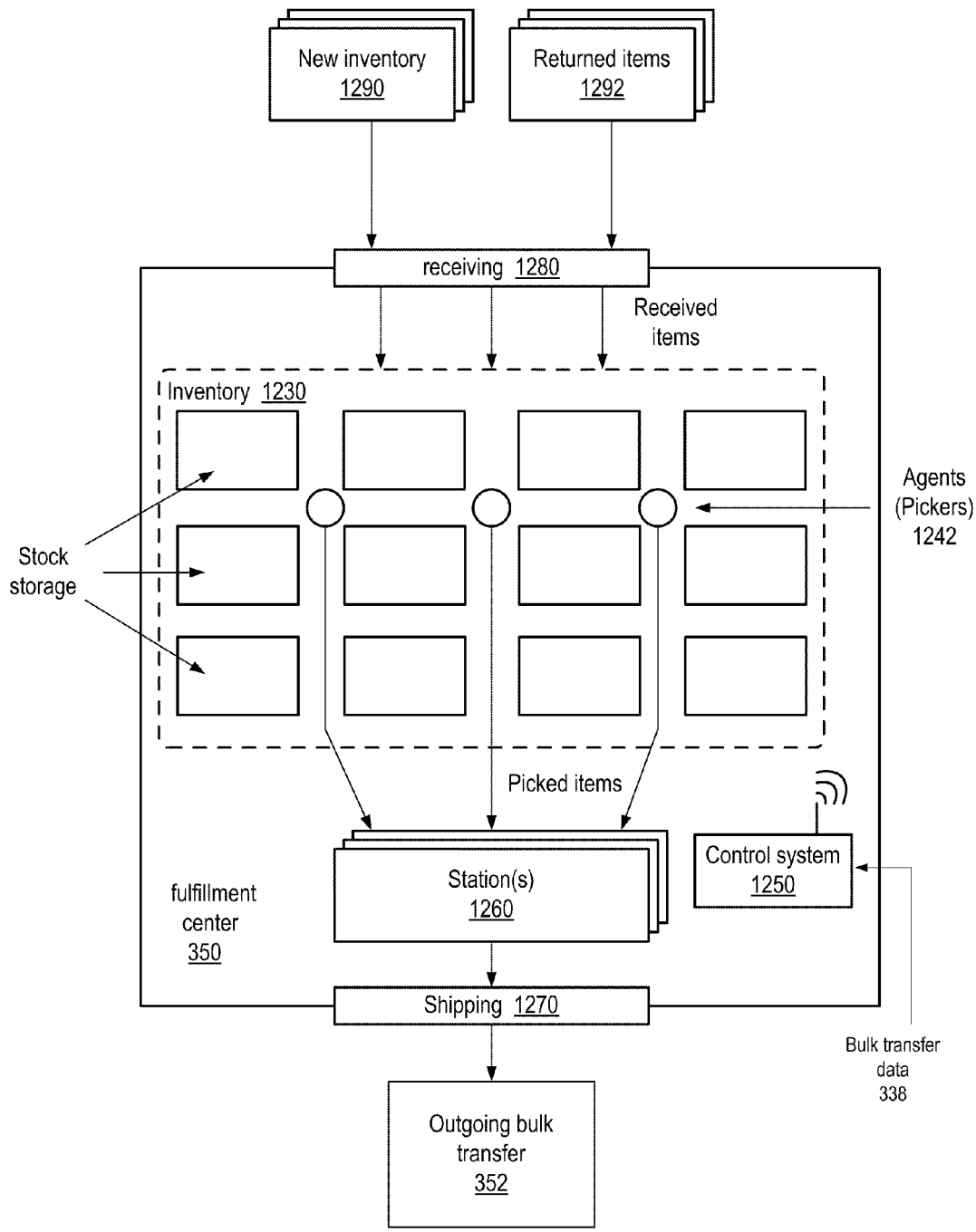
FIG. 17 illustrates the physical layout and operations of an example fulfillment center when fulfilling a bulk transfer order, according to some embodiments.

In back end 302 operations, tote delivery service logic 332 of enterprise logic 330 may retrieve and process tote delivery data 336 to generate bulk transfer data 338. Bulk transfer data 338 is provided to fulfillment centers 350 of the network enterprise's order fulfillment network. In at least some embodiments, bulk transfer data 338 directs the fulfillment centers 350 to pick from inventory and bulk-transfer items for delivery in one or more tote delivery runs to each of one or more tote delivery zones on a specific tote delivery day at each sortation node 360. A bulk pick for and bulk transfer to a particular sortation node 360 may be performed one or more times in a given day at a given fulfillment center 350, but are not necessarily performed every day. Also note that items bulk picked on a given day are not necessarily bulk transferred on the same day. FIG. 17 illustrates operations of an example fulfillment center 350 according to some embodiments. Referring to FIG. 5, note that a sortation node 360 may be, but is not necessarily, located within a fulfillment center 350; a transfer may thus be a transfer to a sortation node 360 within a fulfillment center 350, a transfer from one fulfillment center 350 to another fulfillment center 350, or a transfer from a fulfillment center 350 to a stand-alone sortation node 360. A sortation node 360 may be a node in the network enterprise's order fulfillment network that is owned and operated by the network enterprise. Alternatively, a sortation node 360 may be owned and/or operated by another entity, such as a local carrier or delivery company that owns and/or operates the tote delivery vehicles.

Each fulfillment center 350 may send at least one separate bulk transfer 352 of items for tote delivery on the specific tote delivery day to at least one of one or more sortation nodes 360. Note that a bulk transfer may be scheduled to arrive at a sortation node 360 before the respective tote delivery day or, alternatively, on the tote delivery day. In some embodiments, bulk transfer data 338 may not include specific customer order information that indicates which customer ordered what items; only quantities of particular items to be picked and transferred to particular sortation nodes 360 may be described. In some embodiments, in addition to bulk transfers from fulfillment centers 350, a sortation node 360 may receive bulk transfers or other shipments directly from one or more vendors or merchants that include items for tote deliveries.

Tote delivery service logic 332 may also process tote delivery data 336 to generate zone delivery data 340. Zone delivery data 340 may be provided to sortation nodes 360 of the network enterprise's order fulfillment network. In at least some embodiments, zone delivery data 340 directs the sortation nodes 360 in sorting the items received in one or more bulk transfers 352 from fulfillment centers 350 or from other sources, on or before the respective zone delivery days, into reusable totes for delivery to specific customer addresses 372 in specific delivery zones 370 on respective zone tote delivery days. FIG. 18 illustrates operations of an example sortation node according to some embodiments.

Referring to FIG. 5, each sortation node 360 may provide tote delivery service to one or more delivery zones 370. In some embodiments, delivery zones 370 may be determined by zip code. In other embodiments, other geographic information, or other types of information, may be used to determine delivery zones. Generally, a sortation node 360 will deliver to multiple zones 370, with different ones of the zones 370 scheduled for delivery on different days of the week. In some implementations, the tote delivery service may be provided every day of the week, and in other implementations the tote delivery service may not be provided on some days (e.g., Monday through Saturday or Monday through Friday). In some embodiments, one or more zones served by a sortation node may be given more than one tote delivery day per week. A sortation node 360 may, but does not necessarily, deliver to more than one zone 370 on a given day. In some embodiments, for at least some zones 370, a respective sortation node 360 may deliver to at least some customers 310 in the zone 370 on two or more days a week. Generally, only one sortation node 360 serves each tote delivery zone 370; however, in some implementations, two or more sortation nodes 360 may serve the same zone 370. In some embodiments, two or more tote delivery runs may be made to a given zone on a given tote delivery day at different time slots, for example a morning tote delivery run and an evening tote delivery run. In these embodiments, individual customers may be assigned a particular time slot on a tote delivery day, or alternatively a customer may specify which time slot on the tote delivery day that the customer wants to receive the tote delivery.

The reusable totes containing items to be delivered to customer addresses 372 are loaded onto one or more delivery vehicles for delivery runs 362 to specific tote delivery zones 370. In some embodiments, the totes may be loaded onto rolling racks, and the racks may be loaded onto the delivery vehicles. In some embodiments, the totes may be placed into receptacles, such as open-top bins, and the receptacles, including the totes, may then be loaded into the delivery vehicles, for example on mobile racks. See FIG. 4B for an example of a tote in a receptacle. In some embodiments, the receptacles may already be in the delivery vehicles, and the totes may be placed into the receptacles inside the delivery vehicles. In some embodiments, one or more totes may be placed into each receptacle. In some embodiments, the receptacles into which the totes are placed may each include a tote delivery indicator 262 as shown in FIG. 4B that may be used by tote delivery personnel to determine the delivery address for the tote(s) contained therein. On a delivery run to a tote delivery zone 370, the delivery personnel on the delivery vehicle drop each tote off at a respective customer address 372. Generally, only one tote will be dropped at a given address 372; however, in some cases, more than one tote may be required to deliver all the items to be delivered on a given delivery day to a given address 372. The delivery personnel may also pick up one or more previously delivered totes from at least some addresses 372. In some embodiments, a given delivery vehicle may deliver to more than one zone 370 on a given delivery run, or on a given delivery day.

A picked-up tote may be empty, or may include one or more previously delivered items that the respective customer is returning to the network enterprise. In some embodiments, items that are shipped according to other shipping methods may also be returned to the network enterprise via the tote delivery service. In some embodiments, other items than return items may be delivered from a customer to the network enterprise via returned totes. For example, in some embodiments, video game rentals, DVD/Blu-Ray disc rentals, exchanges, items for repair, items being sent to the network enterprise for credit or resale, and so on may be delivered from a customer to the network enterprise or to some other entity via return totes and the tote delivery service. As another example, in some embodiments, a merchant or seller may deliver items to the network enterprise via return totes. The delivery vehicles may then return the picked-up totes to the respective sortation nodes 360. At the sortation node 360, any items that are in the returned totes may be removed and appropriately processed.

Front End Operations

In front end operations, customers may access a user interface 320 to tote delivery service logic 332 of enterprise logic 330 to order items to be delivered according to the tote delivery service and to manage their tote orders. Embodiments of the user interface 320 may provide one or more methods via which a customer may place items into tote orders to be delivered according to the tote delivery service. Some examples of tote ordering methods and tote delivery service user interfaces are provided herein. These examples are not intended to be limiting.

Figure 6:
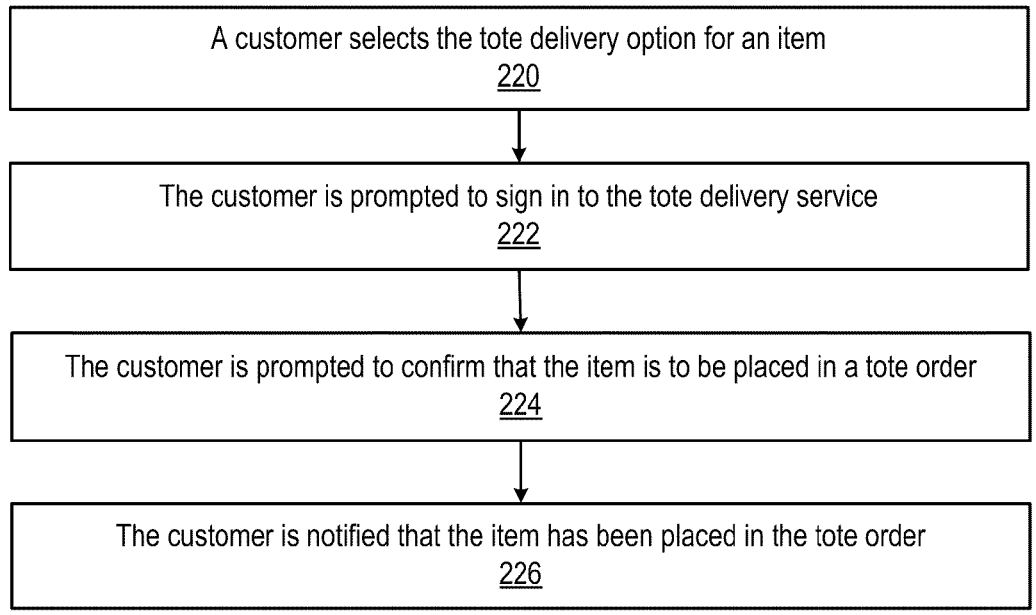
FIG. 6 is a flowchart of placing an item into a tote order via a tote ordering pipeline, according to at least some embodiments.
Figure 8:
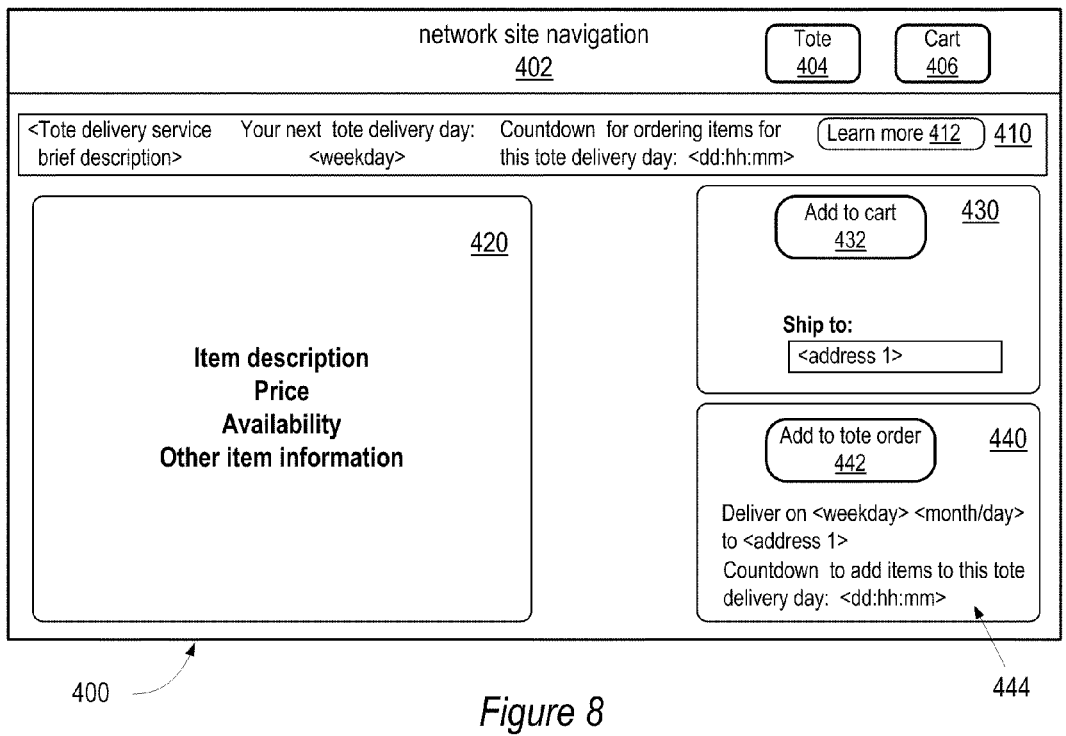
FIG. 8 illustrates an example web page of a network site that provides one or more tote delivery service UI elements, according to some embodiments.
Figure 13:
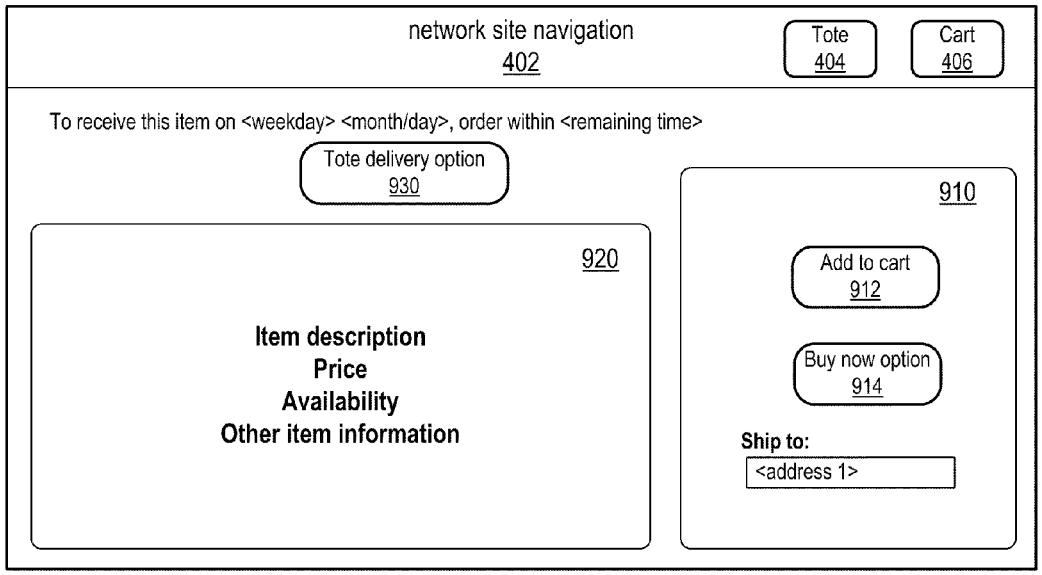
FIG. 13 illustrates an example item detail page that may be presented to a customer that is not subscribed to a subscription-based shipping program provided by the network enterprise, according to some embodiments.
Figure 14:
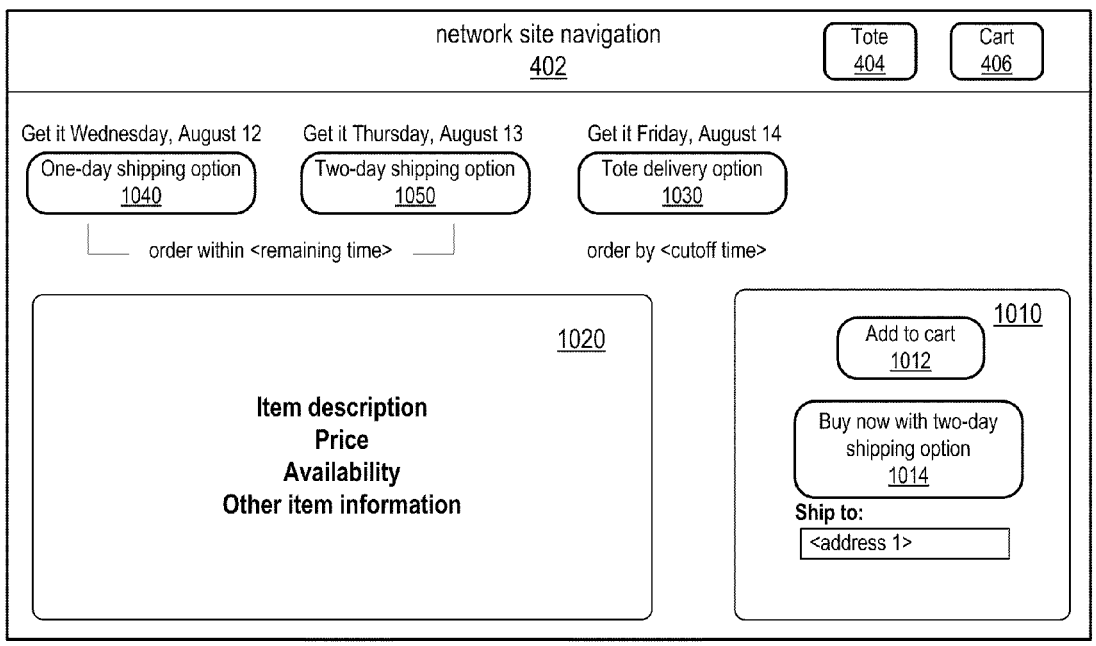
FIG. 14 illustrates an example item detail page that may be presented to a customer that is subscribed to a subscription-based shipping program provided by the network enterprise, according to some embodiments.

FIG. 6 is a high-level flowchart of placing an item into a tote order via a tote ordering pipeline, according to at least some embodiments. As indicated at 220, a customer may select the tote delivery option for an item. For example, the customer may select the tote delivery service option from an item detail page. Example item detail pages are illustrated in FIGS. 8, 13 and 14. As indicated at 222, the customer may be prompted to sign in to the tote delivery service. In some embodiments, the customer may be required to provide at least a password each time the customer wants to add an item to a tote order. FIG. 10 shows an example tote delivery service sign in page that may be displayed to the customer in at least some embodiments. As indicated at 224, the customer may be prompted to confirm that the item is to be placed in a tote order. In some embodiments, a confirmation web page may be displayed, for example web page 700 of FIG. 11, via which the customer can confirm that the item is to be added to the tote order. As indicated at 226, the customer may be notified that the item has been placed in the tote order. In some embodiments, a web page may be displayed, for example web page 800 of FIG. 12, that notifies the customer that the item has been added to the tote order. In some embodiments, the customer may be notified via one or more other communications channels, such as email, text message, or telephone.

Figure 7:
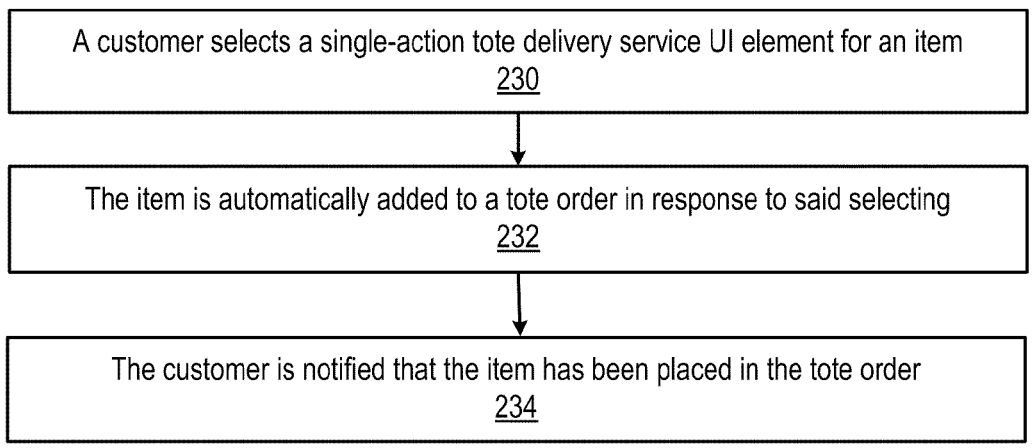
FIG. 7 is a flowchart of placing an item into a tote order using a single-action user interface element, according to at least some embodiments.

FIG. 7 is a flowchart of placing an item into a tote order using a single-action user interface element, according to at least some embodiments. As indicated at 230, a customer may select a single-action tote delivery service UI element for an item. for example, element 442 of item detail page 400 shown in FIG. 8 may be a single-action user interface element. As indicated at 232, the item may be automatically added to an upcoming tote order in response to the customer selecting the single-action element. As indicated at 234, the customer may be notified that the item has been placed in the tote order. In some embodiments, a web page may be displayed, for example web page 800 of FIG. 12, that notifies the customer that the item has been added to the tote order. In some embodiments, the customer may be notified via one or more other communications channels, such as email, text message, or telephone.

Example Tote Delivery Service User Interface

FIGS. 8 through 16 illustrate examples of various user interface (UI) screens and UI elements that may be used in at least some embodiments of the tote delivery service as part of the front end 300 subsystem of the tote delivery service as illustrated in FIG. 5. These UI screens and UI elements are given by way of example, and are not intended to be limiting. In at least some embodiments, the example UI screens shown in FIGS. 8 through 16, variations thereof, and/or other UI screens, may be provided as web pages by a network site of a network enterprise to enable various functions and features of the tote delivery service according to various embodiments. Note that, in some embodiments, other UI screens than the example UI screens illustrated in the Figures may be provided by the network site; at least some of these other UI screens may include one or more UI elements related to the tote delivery service.

In the example UI screens shown in FIGS. 8 through 16, the customer interface to the tote delivery service is shown as a graphical user interface (GUI) that is suitable for display on a personal computer or other similar device with a relatively large display device. In some embodiments, implementations of the tote delivery service user interface may be presented on any suitable device, for example on a Personal Digital Assistant (PDA) or other handheld device, on a cell phone using audio prompts, etc, using any of a variety of other presentation methods, UI screens, UI elements, etc.

In at least some embodiments, customers may be required to already have, or to set up if they do not already have, a user account on the network site to receive and/or to access at least some of the UI screens and UI elements illustrated in FIGS. 8 through 16, and to use the tote delivery service described herein. The customer may have provided customer information including, but not limited to, delivery/shipping address, billing address, and payment method information in the process of setting up a user account with the network site.

In some embodiments, the tote delivery service may not be available for all customers of the network site; for example, in some embodiments, the tote delivery service may only be offered in areas with relatively high population densities, such as cities or towns, and thus at least some rural customer addresses may not qualify for the service. However, in some embodiments, a customer may have multiple shipping addresses associated with their account; thus, for a given customer, one or more shipping addresses may qualify for the tote delivery service, while one or more other shipping addresses may not qualify.

In some embodiments, the tote delivery service may be provided to customers of other enterprises, such as other network enterprises than the network enterprise that provides the tote delivery service. Items that another enterprise's customers order for delivery by tote (either via the network enterprise's network site or by some other method, such as a web site of the other enterprise) may be transferred into the network enterprise's order fulfillment network via one or more ingestion channels. The other enterprise's items may be sorted into outgoing totes at sortation nodes to fulfill their customers' tote orders. Note that, in some embodiments, the other enterprise's items may be placed into totes along with items from the network enterprise that provides the tote delivery service.

In some embodiments, a customer with an account may also be required to sign up for, or sign in to, the tote delivery service to use the tote delivery service and to gain access to at least some of the UI screens and UI elements illustrated in FIGS. 8 through 16. In other embodiments, the tote delivery service may be provided to all qualified customers with an account without requiring the customers to sign up or sign in. In some embodiments, the network site may not charge any sign-up or delivery fees for the tote delivery service; the tote delivery service may be offered as a free delivery service to all qualified customers. In some embodiments, the network enterprise may charge a fee to sign up for the tote delivery service, and/or may charge a delivery fee for each delivery. However, generally, any fees charged by the network enterprise for the tote delivery service may be less than conventional shipping fees.

In some embodiments, the tote delivery service may be offered to some customers at lower cost, or no cost, while being offered to other customers at a higher cost. For example, in some embodiments, customers that are members in a subscription-based shipping program may be offered the tote delivery service at lower cost or no cost. As another example, in some embodiments, customers in areas with relatively high population densities, such as cities or towns, may be offered the tote delivery service at lower cost or no cost, while customers in areas with lower population densities (e.g., rural areas) may be offered the tote delivery service at higher cost. In some embodiments, the customer may be charged a nominal fee or deposit for each tote. In some embodiments, this tote fee or deposit may be refunded to the customer upon return of a tote.

At least some embodiments of the tote delivery service user interface may provide one or more single-action user interface elements, for example on an item detail page, via which a customer may initiate an order for an item provided by the network site to be delivered according to the tote delivery service. In some embodiments, the tote delivery service user interface may also provide one or more single-action user interface elements via which a customer may initiate an order for an item provided by the network site according to one or more other shipping options provided to the customer by the network site, for example according to a subscription-based shipping program, where each shipping option is associated with a particular one of the single-action user interface elements. In some embodiments, one or more of these single-action shipping options may only be presented to customers that are current subscribers of a subscription-based shipping program, and not to non-subscribed customers. In embodiments that use single-action user interface elements for shipping options, including but not limited to a tote delivery service shipping option, a single action by a customer on a user interface provided by the network site to select a particular one of the shipping options provided by the network site may automatically initiate the purchase order, processing, and shipping or delivery of an item offered by the network site according to the selected shipping option, for example the tote delivery service option. Information associated with the customer including, but not limited to, shipping address, billing address, and payment method information may be used in the automatic processing of the order in response to the single action selection of the shipping option.

In some embodiments, one or more other single-action items to initiate other services provided by the network site may be presented to customers of the network site. For example, in some embodiments, all customers that have an account with the network site, whether or not the customer is subscribed to a shipping program offered by the network enterprise or signed up for the tote delivery service, may be presented with at least one single-action user interface element for initiating a purchase order on the item detail pages of items offered for sale by the network site.

Methods and systems for the single-action initiation of a purchase order are described in U.S. Pat. No. 5,960,411, titled "Method and System for Placing a Purchase Order via a Communications Network", issued Sep. 28, 1999, which is hereby incorporated by reference.

Methods and apparatus for subscription-based shipping programs are described in U.S. Pat. No. 7,590,565, titled "METHOD AND APPARATUS FOR SUBSCRIPTION-BASED SHIPPING", issued Sep. 15, 2009, which is hereby incorporated by reference.

Example Tote Delivery Service User Interface Ordering Process

FIGS. 8 through 12 illustrate example web pages that may be displayed in ordering an item or items to be delivered by tote according to embodiments of the tote delivery service, for example according to the method illustrated in FIG. 6. These web pages are given by way of example, and are not intended to be limiting.

FIG. 8 illustrates an example web page of a network site that provides one or more tote delivery service UI elements, according to some embodiments. This example web page 400 is an item detail page via which a customer may order one or more units of a particular item, but note that tote delivery service UI elements may be provided on one or more other web pages of the network site, such as the "home" page. Network site navigation 402 may include one or more UI elements, such as buttons, tabs menus, etc., via which the customer may navigate to other pages on the network site and/or perform other functions, such as searches. In at least some embodiments, network site navigation 402 may include a tote 404 user interface element and/or a cart 406 user interface element. Selecting tote 404 may display a web page indicating the contents of the customer's current tote order. Selecting cart 406 may display a web page indicating the contents of the customer's current shopping cart order(s). A shopping cart may be defined as a virtual location that holds items that have been or are being ordered by the customer via some other shipping option or options than the tote delivery shipping option. Item detail area 420 may provide relevant graphical and/or textual information about the particular item associated with this item detail web page, such as an item description, price, availability of the item, and other item information such as a picture of the item. User interface area 430 may include one or more user interface elements for selecting standard options of the network site, such as an "Add to cart" button 432 that allows the user to add the item shown on the web page to a collection, or cart, of items that the customer may purchase when done selecting items. Area 430 may also include a user interface element, such as a pop-up menu or text box, via which the customer may select a shipping address for the item, if ordered. The address selection user interface element may default to a default shipping address of the current customer's account.

Web page 400 may include a banner, bar, or other UI element, shown here as element 410, which may display information about the tote delivery service. This element 410 may include a user-selectable UI element 412, such as a hot link or button, that, when selected, may take the customer to a web page that provides additional information about the tote delivery service. Example of such web pages are shown in FIGS. 9A through 9D. Element 410 may also include an indication of an upcoming tote delivery day for the customer (e.g., Friday), and a countdown timer for the cutoff for ordering items to be delivered on the indicated tote delivery day (e.g., 1 day, 12 hours, and 13 minutes and counting). In some embodiments, element 410 may not be displayed to customers that are known to have already signed up to the tote delivery service.

Web page 400 may include an area 440 which may allow a customer to place the item associated with the item detail page into the customer's virtual tote for delivery via the tote delivery service and which may display delivery information for the tote via the tote delivery service. This area 440 may include a user-selectable UI element 442, such as a button, that, when selected, may place the item in the customer's virtual tote for delivery to the address specified in area 430 on the tote delivery day shown in UI element 444. Area 440 may also include an indication of an upcoming tote delivery day for the customer (e.g., Friday), and a countdown timer for the cutoff for ordering items to be delivered on the indicated tote delivery day.

In some embodiments, UI element 442 may be a single-action user interface element. In these embodiments, selecting UI element 442 may automatically initiate the purchase order, processing, and delivery of the item according to the tote delivery service. Information associated with the customer including, but not limited to, shipping address, billing address, and payment method information may be used in the automatic processing of the order in response to the single action selection of UI element 442.

In some embodiments, UI element 442 may open a different web page via which the customer may continue placing the order for the item via the tote delivery service. For example, in embodiments in which a customer is required to sign in to the tote delivery service, if the customer is not currently signed in, selecting UI element 442 may open a web page such as web page 600 shown in FIG. 10 via which the customer signs in to the tote delivery service. As another example, in some embodiments, selecting UI element 442 may open a web page such as web page 700 shown in FIG. 11 via which a customer may confirm or complete an order to be delivered via the tote delivery service.

While FIG. 8 shows areas 430 and 440 as separate areas, in some embodiments, the UI elements shown in areas 430 and 440 may be combined into one area.

In some embodiments, web page 400 may include a link (not shown) to a "sign in" web page such as web page 600 of FIG. 10 via which the customer may sign in to the tote delivery service. In some embodiments, a customer may be required to sign in to the tote delivery service each time the customer adds an item to a tote. In other embodiments, the customer may only be required to sign in to the tote delivery service once per session.

FIGS. 9A through 9D show examples of web pages that may provide additional information about embodiments of the tote delivery service. Note that these web pages or the content thereof are given by way of example, and are not intended to be limiting.

FIG. 9A illustrates an example web page that provides information about an example embodiment of the tote delivery service. Web page 500 may, for example, be reached by selecting a UI element on another web page, such as UI element 412 of the item detail page 400 shown in FIG. 8. Network site navigation 402 may include one or more UI elements, such as buttons, tabs menus, etc., via which the customer may navigate to other pages on the network site and/or perform other functions, such as searches. In at least some embodiments, network site navigation 402 may include a tote 404 user interface element and/or a cart 406 user interface element. Selecting tote 404 may display a web page indicating the contents of the customer's current tote order. Selecting cart 406 may display a web page indicating the contents of the customer's current shopping cart order(s). Web page 500 may, for example, include a general description of the tote delivery service, instructions on how to use the tote delivery service, and indications of the particular customer's tote delivery day(s) (in this example, Friday) and order deadline for placing items in the tote for delivery on the tote delivery day (in this example, Tuesday, two days or 48 hours before the scheduled tote delivery day (Friday)).

Web page 500 may also include one or more links to other web pages, such as a link to a Frequently-Asked Question (FAQ) web page and a link to a terms and conditions web page for the tote delivery service, and/or a link to a "sign in" web page such as web page 600 of FIG. 10 via which the customer may sign in to the tote delivery service. Web page 500 may also include information and/or a UI element via which a customer may contact the network enterprise with questions or concerns about the tote delivery service, for example a UI element that opens an email message to an email address of the network enterprise, or a phone number that the customer may call.

FIG. 9B illustrates another example of a web page that provides information about an example embodiment of the tote delivery service. In some embodiments, customers may be required to sign in to the tote delivery service. FIG. 9B shows a web page that includes a delivery information area that may, for example include a UI element via which the customer may enter the customer's email address. The email address may be used to identify the customer and/or to send the customer notifications and reminders related to the tote delivery service. Delivery information area may also include a UI element via which the customer may enter their password. Delivery information area may also include a UI element, such as sign in button 512, via which the customer may complete the sign in process after entering their email address and password.

In some embodiments, some customers may be given more tote delivery days per week than other customers. For example, a network enterprise may provide a subscription-based shipping program; subscribers to the shipping program may be provided with one or more shipping options, and possibly other options, that are not provided to non-subscribed customers. Customers that are subscribed to the shipping program may be given an additional tote delivery day as a benefit of being subscribers. In some embodiments, customers that are subscribed to the shipping program may be benefits, such as a shorter cutoff time for ordering items to be delivered by tote. Thus, in some embodiments, a web page that provides information about the tote delivery service may be different for some customers, for example customers that are subscribed to a shipping program, than a web page that provides information to a non-subscribed customer. FIG. 9C illustrates an example of a web page that provides information about an example embodiment of the tote delivery service to a customer that has one assigned tote day per week (Wednesday, in this example). FIG. 9D illustrates an example of a web page that provides information about an example embodiment of the tote delivery service to a customer that has two assigned tote day per week (Wednesday and Saturday, in this example), for example to a customer that is subscribed to a subscription-based shipping program.

FIG. 10 illustrates an example web page via which a customer may sign in to the tote delivery service, according to some embodiments. In some embodiments, a customer may be required to sign in to the tote delivery service each time the customer adds an item to a tote, or at least provide a tote delivery service password. Web page 600 may, for example, be reached by selecting a UI element on another web page, such as UI element 442 of the item detail page 400 shown in FIG. 8, UI element 930 of item detail page 900 shown in FIG. 13, or UI element 1030 of item detail page 1000 shown in FIG. 14, if the customer is not currently signed in to the tote delivery service, or if the tote delivery service requires the customer to sign in each time an item is ordered to be delivered via tote delivery. In some embodiments, web page 600 may be reached from a "sign in" UI element on the network site's home page, or from a menu item or button in network site navigation 402 area of another web page. Network site navigation 402 may include one or more UI elements, such as buttons, tabs menus, etc., via which the customer may navigate to other pages on the network site and/or perform other functions, such as searches. In at least some embodiments, network site navigation 402 may include a tote 404 user interface element and/or a cart 406 user interface element. Selecting tote 404 may display a web page indicating the contents of the customer's current tote order. Selecting cart 406 may display a web page indicating the contents of the customer's current shopping cart order(s).

Web page 600 may include a sign in area 610 via which a customer may sign in to the tote delivery service. Sign in area 610 may, for example include a UI element via which the customer may enter the customer's email address. The email address may be used to identify the customer and/or to send the customer notifications and reminders related to the tote delivery service. Sign in area 610 may also include one or more UI elements via which the customer may indicate whether the customer is a new customer or an existing customer. In this example, radio buttons are used. If the customer indicates that he or she is a new customer, one or more UI elements may be presented on web page 600 via which the customer may "sign up" for the tote delivery service and receive or specify a password. Alternatively, the customer may be taken to another web page to sign up for the tote delivery service. If the customer indicates that he or she is already signed up (i.e., already has a password), as shown in FIG. 10, then a UI element may be presented via which the customer may enter their password. Sign in area 610 may also include a UI element, such as sign in button 612, via which the customer may complete the sign in process after entering their email address and password.

Web page 600 may, but does not necessarily, include an area in which the customer's current (virtual) tote contents, if any, may be displayed. Note that the items may or may not actually be physically present in a physical tote. Each item shown may include item information such as a brief item description, quantity, and price.

FIG. 11 illustrates an example web page via which a customer may confirm that an item is to be placed in a pending tote order, according to some embodiments. Web page 700 may, for example, be reached by selecting a UI element on another web page, such as UI element 442 of the item detail page 400 shown in FIG. 8, UI element 930 of item detail page 900 shown in FIG. 13, or UI element 1030 of item detail page 1000 shown in FIG. 14. Network site navigation 402 may include one or more UI elements, such as buttons, tabs menus, etc., via which the customer may navigate to other pages on the network site and/or perform other functions, such as searches. In at least some embodiments, network site navigation 402 may include a tote 404 user interface element and/or a cart 406 user interface element. Selecting tote 404 may display a web page indicating the contents of the customer's current tote order. Selecting cart 406 may display a web page indicating the contents of the customer's current shopping cart order(s).

Web page 700 may include an area 710 via which the customer may choose from among multiple shipping addresses and/or tote delivery days to or on which an item or items currently being purchased will be delivered in a tote. A customer may have one, two, or more different shipping addresses that are eligible for the tote delivery service. Different shipping addresses for a customer may be, but are not necessarily, in different delivery zones. Thus, the customer may have one shipping address with one day (e.g., Wednesday) as the tote delivery day, and another shipping address with a different day (e.g., Friday) as the tote delivery day. In the example shown in FIG. 10, the customer has two different tote delivery days (delivery day 1 and delivery day 2) to two different shipping addresses (address 1 and address 2), and the customer may select one or the other (e.g., via radio buttons as shown in this example) as the tote delivery day for a current item or items. Note, however, that the delivery day for two different delivery addresses may be the same delivery day. Also note that a customer may have only one delivery address, and thus may have only one delivery day, and thus may not be given an option. However, in the latter case, the customer may be given the option of selecting a future delivery day (e.g., Friday next week, instead of Friday this week, to the given shipping address).

In some embodiments, a customer may have multiple tote delivery days in a week to the same shipping address, for example Tuesday and Friday to a given address. In some embodiments, all customers may be given two (or more) tote delivery days per week. In some embodiments, a subset of delivery addresses may be given two (or more) tote delivery days per week; for example, delivery addresses in some but not all delivery zones may be given two tote delivery days per week. As another example, in some embodiments, subscribers to a subscription-based shipping program may be given two (or more) tote delivery days per week, rather than the standard one tote delivery day per week provided to non-subscribed customers, as a benefit of being subscribed to the shipping program. Area 710 may thus allow a customer to specify which upcoming tote delivery day the customer wants the item to be delivered.

Web page 700 may also include a payment and billing area 730. Payment and billing area 730 may display the current payment method to be used to bill the customer, e.g. a Visa or other credit card account. Payment and billing area 730 may include a user interface element that allows the subscriber to change the payment method, if desired. Payment and billing area 730 may also display the current billing address for the customer payment and billing area 730 may include a user interface element that allows the subscriber to change the billing address, if desired.

Web page 700 may, but does not necessarily, include an area 720 in which the customer's current (virtual) tote contents, if any, may be displayed. This example shows that this customer has two items (item 1 and item 2) currently in their virtual tote pending tote delivery on the selected upcoming tote delivery day (day 2, in this example). Note that the items in the virtual tote may or may not actually be physically present in a physical tote. Also note that the displayed tote contents for a given tote represent a tote order. Each item shown may include item information such as a brief item description, quantity, and price. In some embodiments, area 720 may include, for each item, a UI element (e.g., a link to another web page, shown as "Change" in this example) via which the customer may choose to change an item, or the quantity of an item, in a tote order. Note that changing may include removing the item from a tote order, moving the item to a different tote order, or changing the quantity of the item in the tote order. For example, in some embodiments, selecting the "change" UI element may open a web page via which the customer may manage the current content of one or more virtual totes; an example of such a web page is shown as web page 1100 in FIG. 15.

Web page 700 may, but does not necessarily, include a tote order summary area 740 that may display summary information for the items in the virtual tote as they are currently displayed in area 720, such as the cost of the items, shipping charges (free, in this example), total pre-tax cost of the items, any relevant taxes or an estimation thereof, total cost of the items, discounts, and possibly other relevant information about the tote order. Note that the tote order summary 740 is specific to the tote order for a given tote delivery day to a given tote delivery address. The items in the respective virtual tote are treated as one tote order, even though the items in the tote may have been ordered at different times that may be hours, days, or even weeks apart.

Web page 700 may include a UI element 742, such as a button, via which the customer may confirm that the item is to be added to a specified tote order. Selecting this UI element 742 causes the current item, as specified by the customer, to be placed into the specified virtual tote, and into the corresponding tote order. Web page 700 may also include a UI element via which the customer may cancel the order confirmation shown on the page, if desired. Selecting UI element 742 may cause the network enterprise logic to enter or modify the tote order in the system for processing, picking, and delivery by tote on the indicated tote delivery day to the indicated customer address. Selecting this UI element 742 may also open a web page that confirms that the tote order has been placed or modified, such as web page 800 shown in FIG. 12. Selecting this UI element 742 may cause the network enterprise logic to perform other actions, such as notifying the customer, by email or some other communications channel, to confirm that the tote order has been placed or modified, is being processed, and will be delivered by tote on the scheduled tote delivery day to the respective customer address.

FIG. 12 illustrates an example web page that confirms that a tote order has been placed by the customer, according to some embodiments. Web page 800 may be reached, for example, by selecting UI element 742 of web page 700 shown in FIG. 11. Network site navigation 402 may include one or more UI elements, such as buttons, tabs menus, etc., via which the customer may navigate to other pages on the network site and/or perform other functions, such as searches. In at least some embodiments, network site navigation 402 may include a tote 404 user interface element and/or a cart 406 user interface element. Selecting tote 404 may display a web page indicating the contents of the customer's current tote order. Selecting cart 406 may display a web page indicating the contents of the customer's current shopping cart order(s).

Web page 800 may, but does not necessarily, include a tote order summary area 840 that may display summary information for the tote order, such as the tote order number, tote delivery address and tote delivery day, a summary of the items in the tote order, total cost of the tote order, and possibly other relevant information about the tote order, such as discounts. Note that the tote order summary 740 is specific to the tote order for a given tote delivery day to a given tote delivery address. The items in the respective tote are treated as one tote order, even though the items in the tote may have been ordered at different times that may be hours, days, or even weeks apart.

Web page 800 may also include an indication of a tote order number via which the customer may track the tote order, the number of items and/or a description of the items that will be in the delivered tote, and the delivery day or date on which the tote will be delivered to the customer address. Web page 800 may also inform the customer that a confirmation has been sent to the customer via another communications channel, such as email.

Web page 800 may also include a UI element 812 via which the customer may open another web page on which the customer may view or edit the contents of one or more virtual totes; an example of such a web page is shown as web page 1100 in FIG. 15. Web page 800 may also include a UI element 810 via which the customer may open, or return to, another web page to continue shopping.

In some embodiments, web page 800 may also include an item recommendations area 820 that may display recommendations of one or more other items that the customer may wish to order, using the tote delivery service or possibly some other shipping option. Area 820 may list information about these one or more recommended items, such as an image, brief description, price, and possibly special offer information where applicable. In some embodiments, the recommended items that are listed may be determined by the enterprise logic based on current or past purchasing history of the customer, including but not limited to the item(s) purchased by the customer in the current tote order. Note that a similar or the same display of recommended items may be shown on other web pages of the network site, including but not limited to one or more of the other example web pages shown in FIGS. 8 through 16. Further note that the recommended items may be included in the confirmation email sent to the customer for the current order, or may be sent to the customer via some other communications channel. In some embodiments, selecting one of the recommended items in area 820 may open an item detail page for that item. Example item detail pages are shown in FIGS. 8, 13, and 14. Alternatively, in some embodiments, selecting one of the recommended items in area 820 may automatically add the item to the current tote order, and may open the web page 700 shown in FIG. 11 so that the customer may re-confirm the modified order. In some embodiments, the customer may be given a choice as to whether a selected recommended item is to be placed into the current tote (thus modifying the current order, e.g. by taking the customer back to web page 700 of FIG. 11) or ordered separately (thus taking the customer to the item detail page for the recommended item).

Integrating the Tote Delivery Service with a Subscription-Based Shipping Program As previously mentioned, a network enterprise may provide a subscription-based shipping program. In the subscription-based shipping program, subscribers to the shipping program may be provided with one or more shipping options, and possibly other options, that are not provided to non-subscribed customers. Furthermore, in some embodiments of the tote delivery service in which the network enterprise also offers a subscription-based shipping program, customers that are subscribed to the shipping program may be given an additional tote delivery day as a benefit of being subscribers. In some embodiments, customers that are subscribed to the shipping program may be given other tote delivery service benefits, such as a shorter cutoff time for ordering items to be delivered by tote on an upcoming tote delivery day. Thus, in some embodiments, item detail pages, and possibly other web pages in the ordering process, that are presented to a customer that is subscribed to a shipping program may be different than an item detail page or other web page that is presented to a non-subscribed customer. FIG. 13 illustrates an example item detail page that may be presented to a non-subscribed customer according to some embodiments, while FIG. 14 illustrates an example item detail page that may be presented to a customer subscribed to such a shipping program, according to some embodiments.

FIG. 13 illustrates an example item detail page that may be presented to a non-subscribed customer according to some embodiments. Web page 900 is an item detail page via which a non-subscribed customer, that is a customer that is not currently subscribed to a subscription-based shipping program offered by the network enterprise, may order one or more units of a particular item to be shipped according to standard (non-subscriber) shipping options or delivered according to the tote delivery service. Network site navigation 402 may include one or more UI elements, such as buttons, tabs menus, etc., via which the customer may navigate to other pages on the network site and/or perform other functions, such as searches. In at least some embodiments, network site navigation 402 may include a tote 404 user interface element and/or a cart 406 user interface element. Selecting tote 404 may display a web page indicating the contents of the customer's current tote order. Selecting cart 406 may display a web page indicating the contents of the customer's current shopping cart order(s).

Item detail area 920 may provide relevant graphical and/or textual information about the particular item associated with this item detail web page, such as an item description, price, availability of the item, and other item information such as a picture of the item. User interface area 910 may include one or more user interface elements for selecting standard options of the network site presented to a non-subscribed customer, such as an "Add to cart" button 912 that allows the customer to add the item shown on the web page to a collection, or cart, of items that the customer may purchase when done selecting items and a "buy now" button 914. In some embodiments, UI element 914 may be a single-action user interface element. In these embodiments, selecting UI element 914 may automatically initiate the purchase order, processing, and delivery of the item according to a standard shipping option offered by the network enterprise. Information associated with the customer including, but not limited to, shipping address, billing address, and payment method information may be used in the automatic processing of the order in response to the single action selection of UI element 914. Area 910 may also include a user interface element, such as a pop-up menu or text box, via which the customer may select a shipping address for the item, if ordered. The address selection user interface element may default to a default shipping address of the current customer's account.

Web page 900 may include a banner, bar, or other UI element (not shown) that may display information about the tote delivery service. Web page 900 may also include a user-selectable UI element, such as a hot link or button, that, when selected, may take the customer to a web page that provides additional information about the tote delivery service. Examples of such a web page are shown in FIGS. 9A through 9D. In some embodiments, these elements may not be displayed to customers that are known to have already signed up to the tote delivery service.

Web page 900 may include a UI element 930, such as a button, that, when selected, may place the item in the customer's virtual tote for delivery to the address specified in area 910 on a displayed tote delivery day, if ordered before a displayed time. In some embodiments, UI element 930 may be a single-action user interface element. In these embodiments, selecting UI element 930 may automatically initiate the purchase order, processing, and delivery of the item according to the tote delivery service. Information associated with the customer including, but not limited to, shipping address, billing address, and payment method information may be used in the automatic processing of the order in response to the single action selection of UI element 930.

In some embodiments, UI element 930 may open a different web page via which the customer may continue placing the order for the item via the tote delivery service. For example, in embodiments in which a customer is required to sign in to the tote delivery service, if the customer is not currently signed in, selecting UI element 930 may open a web page such as web page 600 shown in FIG. 10 via which the customer signs in to the tote delivery service. As another example, in some embodiments, selecting UI element 930 may open a web page such as web page 700 shown in FIG. 11 via which a customer may confirm or complete an order to be delivered via the tote delivery service.

In some embodiments, web page 900 may include a link (not shown) to a "sign in" web page such as web page 600 of FIG. 10 via which the customer may sign in to the tote delivery service.

FIG. 14 illustrates an example item detail page that may be presented to a customer subscribed to such a shipping program according to some embodiments. Web page 1000 is an item detail page via which a customer that is currently subscribed to a subscription-based shipping program offered by the network enterprise may order one or more units of a particular item to be shipped according to one or more shipping options offered to subscribers to the shipping program or delivered according to the tote delivery service. Network site navigation 402 may include one or more UI elements, such as buttons, tabs menus, etc., via which the customer may navigate to other pages on the network site and/or perform other functions, such as searches. In at least some embodiments, network site navigation 402 may include a tote 404 user interface element and/or a cart 406 user interface element. Selecting tote 404 may display a web page indicating the contents of the customer's current tote order. Selecting cart 406 may display a web page indicating the contents of the customer's current shopping cart order(s).

Item detail area 1020 may provide relevant graphical and/or textual information about the particular item associated with this item detail web page, such as an item description, price, availability of the item, and other item information such as a picture of the item. User interface area 1010 may include one or more user interface elements for selecting options of the network site presented to a non-subscribed customer, such as an "Add to cart" button 1012 that allows the customer to add the item shown on the web page to a collection, or cart, of items that the customer may purchase when done selecting items and a "buy now" button 1014. In some embodiments, UI element 1014 may be a single-action user interface element. In these embodiments, selecting UI element 1014 may automatically initiate the purchase order, processing, and delivery of the item according to a shipping option offered by the network enterprise only to subscribed customers, such as free two-day shipping. Information associated with the customer including, but not limited to, shipping address, billing address, and payment method information may be used in the automatic processing of the order in response to the single action selection of UI element 1014. Area 1010 may also include a user interface element, such as a pop-up menu or text box, via which the customer may select a shipping address for the item, if ordered. The address selection user interface element may default to a default shipping address of the current customer's account.

Web page 1000 may include a banner, bar, or other UI element (not shown) which may display information about the tote delivery service. Web page 1000 may also include a user-selectable UI element, such as a hot link or button, that, when selected, may take the customer to a web page that provides additional information about the tote delivery service. Example of such web pages are shown in FIGS. 9A through 9D. In some embodiments, these elements may not be displayed to customers that are known to have already signed up to the tote delivery service.

Web page 1000 may include a UI element 1030, such as a button, that, when selected, may place the item in the customer's virtual tote for delivery to the address specified in area 1010 on a displayed tote delivery day, if ordered before a displayed time. In addition to UI element 1030 via which the customer may order the item to be delivered via the tote delivery service, web page 1000 may include one or more other UI elements via which the customer may choose to order the item to be delivered by one of one or more other shipping options offered via the subscription-based shipping program to subscribed customers. In the example shown in FIG. 14, web page 1000 includes a UI element 1040 via which the customer may select to have the item shipped via a one-day shipping option for a lower shipping cost than is offered to non-subscribed customers, and a UI element 1050 via which the customer may select to have the item shipped via a free two-day shipping option for free, whereas non-subscribed customers are charged some shipping cost for two-day shipping.

In some embodiments, one or more of the s UI elements that provide the various shipping options (in this example, UI elements 1030, 1040, and 1050) may be single-action user interface elements. In these embodiments, selecting one of the UI elements, for example element 1030, may automatically initiate the purchase order, processing, and delivery of the item according to the respective shipping option. Information associated with the customer including, but not limited to, shipping address, billing address, and payment method information may be used in the automatic processing of the order in response to the single action selection of a shipping option UI element.

In some embodiments, selecting UI element 1030 may open a different web page via which the customer may continue placing the order for the item via the tote delivery service. For example, in embodiments in which a customer is required to sign in to the tote delivery service, if the customer is not currently signed in, selecting UI element 1030 may open a web page such as web page 600 shown in FIG. 10 via which the customer signs in to the tote delivery service. As another example, in some embodiments, selecting UI element 1030 may open a web page such as web page 700 shown in FIG. 11 via which a customer may confirm or complete an order to be delivered via the tote delivery service.

Web page 1000 may also display information about the various shipping options offered to the subscribed customer. In this example, web page 1000 displays the dates on which the customer should receive the item if ordered via the various shipping options. Web page 1000 may also display a time by which the item must be ordered respective to each of the two or more shipping options in order to receive the item by the indicated date.

In some embodiments, web page 1000 may include a link (not shown) to a "sign in" web page such as web page 600 of FIG. 10 via which the customer may sign in to the tote delivery service.

In some embodiments, UI elements that provide multiple shipping options to a customer including a tote delivery service shipping option, as shown on web page 1000 of FIG. 14, may be provided on other web pages than the item detail pages. For example, in some embodiments, the user interface may provide a UI element or elements on one or more web pages, for example in a network site navigation area 402, via which the customer may choose to complete an order of one or more items that are currently in the customer's shopping cart (see, e.g., UI element 432 of FIG. 8, UI element 912 of FIG. 13, and UI element 1012 of FIG. 14). A shopping cart may be defined as a virtual location that holds items that have been or are being ordered by the customer via some other shipping option or options than the tote delivery shipping option. Items in a shopping cart are generally processed through a "checkout" process in which the customer confirms or completes the shopping cart order(s). Selecting such a UI element may open an order confirmation or completion web page for the shopping cart. UI elements that provide the multiple shipping options to the customer including the tote delivery service shipping option may be displayed on an order confirmation or completion web page for the shopping cart, or on some other web page displayed during the checkout process, and may be configured to perform actions similar to those described for the shipping option UI elements described for FIG. 14. Note that selecting the tote delivery service shipping option during the shopping cart checkout process may result in one or more item(s) in the virtual shopping cart being moved into a virtual tote order.

Furthermore, while web page 1000 of FIG. 14 is given as an example of an item detail page specific to a customer that is subscribed to a subscription-based shipping program, in some embodiments, including but not limited to embodiments that do provide and embodiments that do not provide such a subscription-based shipping program, non-subscribed customers may be presented with a similar item detail page that provides multiple shipping options to the customer including a tote delivery service shipping option.

Tote Management

As previously noted, at least some embodiments of the tote delivery service may provide a user interface to a network enterprise system that enables customers to manage their own tote deliveries. The tote management user interface may allow the customer to specify tote delivery for items ordered from the network enterprise. The tote management user interface may also, for example, provide a display of virtual totes scheduled for delivery on future tote delivery days. In at least some embodiments the tote management user interface may display previously delivered totes and their contents instead or in addition to future tote deliveries so that customers can view their tote order history. Via the tote management user interface, the customer may, for example, view what items are scheduled to be delivered in which totes, add items to particular totes to be delivered to the customer's shipping address (or shipping addresses) on particular tote delivery days, remove or delete items from totes, move or replicate an item from one tote to another, replicate entire tote orders from one tote delivery day or delivery address to another, and schedule periodic deliveries (e.g., monthly deliveries) of particular items or entire tote orders to be delivered in totes. In addition, in at least some embodiments, the customer may specify, via the user interface, that back-ordered or pre-ordered items are to be delivered by tote; in some embodiments, the tote management user interface may be used to view the projected future tote shipping days for such items as scheduled delivery items, back-ordered items, and pre-ordered items.

FIG. 15 illustrates an example tote management page that may be presented to a customer according to some embodiments. Tote management page 1100 may be reached, for example, by selecting a "Change" user interface element as shown in area 720 of web page 700 illustrated in FIG. 11, or by selecting a UI element 812 on web page 800 illustrated in FIG. 12. In some embodiments, tote management page 1100 may be reached from a "manage your totes" UI element on the network site's home page, or from a "manage your totes" UI element on the customer's account management page, or from a menu item or button in a network site navigation 402 area of another web page. Network site navigation 402, on this and other web pages, may include one or more UI elements, such as buttons, tabs menus, etc., via which the customer may navigate to other pages on the network site and/or perform other functions, such as searches. In at least some embodiments, network site navigation 402 may include a tote 404 user interface element and/or a cart 406 user interface element. Selecting tote 404 may display a web page indicating the contents of the customer's current tote order. Selecting cart 406 may display a web page indicating the contents of the customer's current shopping cart order(s).

Tote management page 1100 may display, in a tote management area 1110, one or more virtual tote UI elements 1112 each corresponding to an upcoming tote delivery day for the customer. In some embodiments, tote management page 1100, or a similar page, may display previously delivered totes 1112 and their contents instead or in addition to upcoming tote deliveries. In this example, the customer has one tote delivery day per week (Friday), and the totes 1112 for four upcoming Friday deliveries are shown. In some embodiments, a given customer may have more than one tote delivery day per week (for example two days, e.g. Wednesday and Friday), and tote management page 1100 may thus display totes 1112 for more than one delivery day per week for the customer.

This example also assumes that the customer has only one shipping address, or that totes 1112 for only one shipping address of the customer are shown. However, a customer may have one, two, or more different shipping addresses that are eligible for the tote delivery service. Different shipping addresses for a customer may be, but are not necessarily, in different delivery zones. Thus, a customer may have one shipping address with one day (e.g., Wednesday) as the tote delivery day, and another shipping address with a different day (e.g., Friday) as the tote delivery day, or a customer may have two or more different shipping addresses with the same tote delivery day. In some embodiments, if the customer has two or more shipping addresses, then tote management page 1100 may display totes 1112 corresponding to each shipping address, and thus may display totes 1112 for more than one delivery day per week, or may display more than one tote 1112 per delivery day (e.g., two totes 1112 for Friday delivery, each to a different shipping address). Alternatively, in some embodiments, a tote management page 1100 may be specific to a particular tote shipping address for the customer, and the customer may have to navigate to a tote management page 1100 corresponding to each different shipping address to view upcoming totes 1112 for that address. In some embodiments, tote management page 1100 may provide one or more UI elements via which the user may choose to view the totes 1112 for a selected one of multiple shipping addresses, or for more than one shipping address, or all shipping addresses, on a single tote management page 1100.

One or more of the displayed virtual totes 1112 may include one or more item 1114 UI elements that the customer has previously added to the tote 1112 corresponding to the delivery day, and possibly also corresponding to a specific delivery address if the customer has more than one shipping address that qualifies for the tote delivery program. Note that a displayed tote 1112 may be empty. Each item 1114 UI element may be displayed graphically, for example as a thumbnail image representing the particular item 1114, and/or textually, for example as a textual link to an item details page corresponding to the item. In some embodiments, selecting an item 1114 UI element may open an item details page for the item. Note that the customer may then add another unit or units of the item to an upcoming tote; upon returning to the tote management page 1100, the added item(s) will be displayed in the appropriate tote 1112.

In some embodiments, tote management page 1100 may provide one or more UI elements or methods via which the customer may modify the content of an upcoming tote 1112. In some embodiments, the customer may remove or delete an item 1114 from an upcoming tote 1112, for example by click-dragging the item 1114 out of the tote 1112 using a cursor control device such as a mouse, by right-clicking on the item 1114 with the mouse and selecting a "remove item" option from a popup menu, or by selecting the item 1114 and choosing a "remove item" or "delete item" option from a menu or other UI element provided elsewhere on the tote management page 1100. In some embodiments, each item 1114 may have a "delete item" or "cancel item" UI element, for example a checkbox, displayed next to the item. The customer may select this UI element to delete or cancel the respective item 1114, or alternatively may select this UI element for one or more items 1114 and then select a "delete" UI element (e.g., element 1122) to delete or cancel the one or more selected items 1114. In some embodiments, the customer may move an item or items 1114 from one upcoming tote 1112 to another upcoming tote 1112, for example by click-dragging the item(s) 1114 out of one tote 1112 into another tote 1112. In some embodiments, the customer may replicate one or more items 1114 from a previously delivered or upcoming tote 1112 to another upcoming tote 1112, for example by click-dragging an item(s) 1114 in one tote 1112 into another tote 1112. In some embodiments, the customer may be asked if the customer wants to replicate or move a click-dragged item or items. In some embodiments, an item or items 1114 in a previously delivered or upcoming tote 1112 may be selected, and the user interface may allow the customer to specify, via one or more user interface elements, that the item(s) 1114 are to be delivered by tote 1112 on a regular schedule, for example once a week, once every two weeks, once a month, and so on.

In some embodiments, tote management page 1100 may provide one or more UI elements or methods via which the customer may manage entire totes 1112. In some embodiments, a tote 1112 for one delivery day may be moved to another delivery day. In some embodiments, a tote 1112 for one delivery day may be replicated to another delivery day, or a tote 1112 for one delivery address may be replicated to another delivery address. In some embodiments, previously delivered totes 1112, as well as upcoming totes 1112, may be replicated. In some embodiments, a tote 1112 may be selected and deleted, thus canceling the orders for all items 1114 in the tote 1112. In some embodiments, a tote 1112 may be selected, and the user interface may allow the customer to specify, via one or more user interface elements, that the current tote 1112 contents are to be delivered by tote on a regular schedule, for example once a week, once every two weeks, once a month, and so on. In some embodiments, previously delivered totes 1112, as well as upcoming totes 1112, may be so scheduled for regular delivery. Some embodiments may provide one or more UI elements, for example a popup menu or buttons, whereby a customer can select an entire tote and specify a particular action to be performed on the tote 1112, for example one or more of "Replicate," "Delete," "Move," and "Schedule for Regular Delivery" actions.

The example tote management page 1100 in FIG. 15 shows four user interface elements (replicate 1120, delete 1122, move 1124, and schedule 1126), such as buttons, that may be used in replicating selected items and/or totes, deleting selected items and/or totes, moving selected items and/or totes, and scheduling selected items and/or totes for regular delivery, respectively, according to some embodiments.

Tote management page 1100 thus allows a customer to, for example, move or replicate an item or items, or an entire tote 1112, from one tote delivery day to another tote delivery day. Since a customer may have multiple delivery addresses, tote management page 1100 may also allow a customer to move or replicate an item or items, or an entire tote 1112, from one delivery address to another delivery address. Thus, embodiments of the tote delivery service, via the user interface and network enterprise logic, may allow a customer to manage his or her tote deliveries across time and across location.

Customer actions on tote management page 1100 that modify the contents of one or more displayed totes 1112 may cause the network enterprise logic (e.g., enterprise logic 330 of FIG. 5) to modify electronic records (e.g., tote delivery data 336 of FIG. 5) corresponding to the tote delivery orders placed by the customer. The network enterprise logic may also send notifications, for example by email or some other communications channel, to the customer notifying the customer of the modifications to the upcoming totes 1112. In some embodiments, the network enterprise logic may not apply the changes to the electronic records until the customer has exited or closed the tote management page 1100. In some embodiments, tote management page 1100 may provide an "apply changes" or similar UI element (not shown in FIG. 15) that the customer may select to apply any changes that the customer has made to the totes 1112 in a current session; in these embodiments, the network enterprise logic may not apply the changes to the electronic records until the customer has indicated that the changes are to be applied.

Tote management page 1100 may provide one or more UI elements via which the customer may scroll, page, or otherwise view other totes 1112 than those currently displayed. For example, tote management area 1110 may include left and right arrow UI elements that allow the customer to step or page through the customers' upcoming and/or previously delivered totes 1112. As another example, tote management area 1110 may include horizontal and/or vertical scroll bars that allow the user to scroll through the customer's upcoming and/or previously delivered totes 1112. In some embodiments, a popup menu or toolbar menu may textually display a list of the customer's upcoming and/or previously delivered tote days; the customer may select a tote day from the menu to display that tote 1112. In some embodiments, tote management area 1110 may include a UI element in which the customer may enter a future or past tote day, and a "go to" UI element that the customer selects to go to (display) the respective tote.

Tote management page 1100 provides a method for the customer to keep track of items that the customer has ordered, as the customer can browse through future scheduled tote deliveries to view what items the customer has pending to be delivered and when the items are scheduled to be delivered via the tote delivery service, rather than the customer having to go back through past orders to try and figure out what items the customer has pending for delivery as in conventional systems. Tote management page 1100 may also provide a method for the customer to review previously delivered totes.

In at least some embodiments, tote management page 1100 may also provide other user interface elements than virtual totes 1112 into which the customer may move items and from which the user may add items to totes 1112. In some embodiments, tote management page 1100 may include a "Shopping Cart" user interface element (not shown in FIG. 15) that displays the current contents of the customer's "shopping cart," that is items that have been or are being ordered by the customer via some other shipping option than the tote delivery shipping option. Tote management page 1100 may allow the customer to move items from the shopping cart into totes 1112, and also may allow the customer to move items from totes 1112 into the shopping cart. In some embodiments, moving an item from the shopping cart into a tote 1112 or moving an item from a tote 1112 into the shopping cart may result in an appropriate web page being displayed via which ordering/shipping method details may be specified by the customer and/or appropriate notification being provided to the customer.

In some embodiments, tote management page 1100 may include a "staging tote" user interface element (not shown in FIG. 15). In at least some embodiments, the enterprise logic and user interface may provide a "staging tote"; the staging tote may be a virtual location where a customer may store items that the customer is considering for tote delivery (or for some other shipping option) but for which the customer has not yet added to a particular tote 1112 or specified to be shipped by some other shipping option. In some embodiments, in addition to an "add to tote order" user interface element, an item detail page, such as item detail pages 400 shown in FIG. 8 and item detail pages 900 and 1000 shown in FIGS. 13 and 14, respectively, may include an "add to staging tote" user interface element; other web pages may also include an "add to staging tote" user interface element. Tote management page 1100 may allow the customer to move items from the staging tote into totes 1112, move items from totes 1112 into the staging tote, and delete items from the staging tote. If tote management page 1100 includes other user interface elements that may include items such as the above-described shopping cart user interface element, the tote management page 1112 may allow the customer to move items from the staging tote into the other user interface element and vice versa.

In at least some embodiments, tote management page 1100 may include one or more user interface elements that allow a customer to return one or more items in a tote or entire tote orders. As another example, in some embodiments, the customer may select one or more items in a tote, or an entire tote order, and select a "return item(s)" or "return tote order" option. In at least some embodiments, tote management page 1100 may include return totes (not shown) as well as delivery totes 1112. The return totes may allow the customer to view and manage items to be returned in totes via the tote delivery service. The user interface may provide one or more user interface elements whereby a customer may add items to a return tote that the customer wants to return, or remove items from, a return tote. In some embodiments, rather than displaying separate return totes, return items may be added to or removed from totes 1112; the user interface may display one or more indications of which items in the cart 1112 are to be delivered on the respective tote delivery day, and which items are to be returned in the return cart on the respective tote delivery day.

In some embodiments, tote management page 1100 may be displayed in various modes. The modes may, for example, be selectable via a user interface element or elements such as a menu, check boxes, or radio buttons. Display modes for the tote management page 1100 may include one or more of, but are not limited to:

An "upcoming tote delivery" mode in which only totes 1112 for upcoming delivery days are shown;

A "previously delivered totes" mode in which only previously delivered totes are shown;

A "return totes" mode in which only totes that include items to be returned are shown;

A "scheduled tote" mode in which only regularly scheduled totes are shown;

An "Address" mode in which only totes for a specified delivery address are shown;

A "delivery day" mode in which only totes for a specified delivery day or days (e.g., Friday) are shown;

A "combination" mode in which two or more of the above are shown; and

A "show all" mode in which all tote management user interface elements are shown.

While the example tote management page 1100 in FIG. 15 shows the totes and items as graphical representations of tote orders, in some embodiments, a tote management page may display the tote orders textually, or using a combination of textual and graphical representation. In some embodiments, the customer may be allowed to choose the display mode (graphical or textual) for the tote management page. In some embodiments, a page may be provided via which the customer may view tote orders, either graphically or textually, but on which the customer is not allowed to modify the tote orders, or is only allowed to perform a subset of the tote management actions described above.

FIG. 16 illustrates an example tote return page that may be presented to a customer according to some embodiments and via which the customer may specify items to be delivered to the network enterprise in return totes, as well as when and from where the item is to be so returned. Tote return page 1150 may be reached, for example, by selecting a "Return an item by tote" user interface element on one or more other web pages. For example, in some embodiments, tote return page 1150 may be reached from a "Return an item by tote" UI element on the network site's home page, on the customer's account management page, or on tote management page 1100, or from a menu item or button in a network site navigation 402 area of another web page. Network site navigation 402, on this and other web pages, may include one or more UI elements, such as buttons, tabs menus, etc., via which the customer may navigate to other pages on the network site and/or perform other functions, such as searches. In at least some embodiments, network site navigation 402 may include a tote 404 user interface element and/or a cart 406 user interface element. Selecting tote 404 may display a web page indicating the contents of the customer's current tote order. Selecting cart 406 may display a web page indicating the contents of the customer's current shopping cart order(s).

Tote return page 1150 may include an area 1160 via which the customer may choose from among multiple shipping addresses and/or tote delivery days to or on which an item or items will be returned in a tote. A customer may have one, two, or more different shipping addresses that are eligible for the tote delivery service. Different shipping addresses for a customer may be, but are not necessarily, in different delivery zones. Thus, the customer may have one shipping address with one day (e.g., Wednesday) as the tote delivery and pickup day, and another shipping address with a different day (e.g., Friday) as the tote delivery and pickup day. In the example shown in FIG. 16, the customer has two different tote pickup days (pickup day 1 and pickup day 2) from two different shipping addresses (address 1 and address 2), and the customer may select one or the other (e.g., via radio buttons as shown in this example) as the tote pickup day for the specified item or items to be returned.

Tote return page 1150 may include an area 1170 via which a customer may specify one or more items to be returned to the network enterprise on the specified tote pickup day from the specified address. This area 1170 may, for example, include a user interface element or elements via which the user may specify the item(s) to be returned, a quantity of the item(s) to be returned, and a reason for return. These user interface elements may include popup menus, text entry boxes, or other suitable user interface elements, or a combination thereof.

Tote return page 1150 may also include an area 1190 in which the customer's current (virtual) tote return items for the specified pickup day and delivery address, if any, may be displayed. This example shows that this customer has one item in their virtual return tote pending pickup on the selected upcoming tote pickup day (day 2, in this example). Each item shown may include item information such as a brief item description and quantity. In some embodiments, area 1190 may include, for each item, a UI element (e.g., a link to another web page, shown as "Change" in this example) via which the customer may choose to change an item, or the quantity of an item, in a return tote. Note that changing may include removing the item from the return tote, moving the return item to a different tote, or changing the quantity of the return item. For example, in some embodiments, selecting the "change" UI element may open a web page via which the customer may manage the current content of one or more virtual totes including return totes; an example of such a web page is shown as web page 1100 in FIG. 15.

Tote return page 1150 may also include a return information area 1180 that may display summary information for the items in the return tote as they are currently displayed in area 1190, such as the refund amount for the item(s), shipping charges (0, in this example) to be refunded, total pre-tax refund amount for the items, any relevant taxes to be refunded, and a total refund amount, and possibly other relevant information about the tote return.

Tote return page 1150 may also include a UI element 1192, such as a button, via which the customer may place the specified item in the specified return tote. Selecting UI element 1192 may cause the network enterprise logic to enter the specified item in the system for pickup by tote on the indicated tote pickup day from the indicated customer address. Selecting this UI element 1192 may cause the network enterprise logic to perform other actions, such as notifying the customer, by email or some other communications channel, to confirm that the item will be picked up by tote on the scheduled tote pickup day from the respective customer address.

While not shown, tote return page 1150 may also include one or more user interface elements whereby a customer may specify how any funds due to the customer are to be provided to the customer; for example, payment by check, by crediting an account such as a credit card account or an account with the network enterprise, or by adding the amount to a "store credit" account with the network enterprise via which the customer can pay, at least in part, for future purchases.

In some embodiments, other items than items being returned to the network enterprise by a customer may be delivered from a customer, or from a seller or merchant, to the network enterprise, or to other entities, via return totes and the tote delivery service. A web page similar to tote return page 1150 may be provided to facilitate the delivery of such items or inventory to the network enterprise via return totes.

Managing Multiple Shipping Options

A network site may provide the tote delivery service as one shipping option among two or more shipping options. For example, the network site may provide a less expensive two-day shipping option, and a more expensive one-day (overnight) shipping option. In addition, a network site may provide, as an alternative to a virtual tote into which items may be placed for tote delivery, a "shopping cart" into which a customer may place items to be ordered later via a checkout process.

In some embodiments, the network site user interface may provide UI elements that allow a customer to move items between shipping options and/or between a virtual tote and a shopping cart. For example, a tote management page 1100 may, in addition to virtual totes 1112, display a virtual "shopping cart" UI element, which may contain one or more items. A shopping cart may be defined as a virtual location that holds items that have been or are being ordered by the customer via some other shipping option or options than the tote delivery shipping option. Items in a shopping cart are generally processed through a "checkout" process in which the customer confirms or completes the shopping cart order(s). The user interface may allow the customer to, for example, drag an item from a virtual tote 1112 into the shopping cart, or vice versa. As another example, a tote management page 1100 may include one or more UI elements that represent one or more other shipping options, such as one-day and two-day shipping options. The user interface may allow the customer to, for example, drag an item from a virtual tote 1112 into the UI element corresponding to a particular shipping option, and vice versa.

In some embodiments, one or more user interface elements that provide the tote delivery service shipping option may be displayed on one or more web pages displayed during the shopping cart checkout process, for example on an order completion page displayed during the shopping cart checkout process. Selecting the tote delivery service shipping option from a web page of the shopping cart checkout process may result in one or more item(s) in the virtual shopping cart being moved into a virtual tote order.

As an example of an application of this ability to move items between shipping options, a customer's tote delivery day to a given address may be Friday. On Monday, the customer may decide that he or she needs an item, currently in the virtual tote scheduled for delivery on the coming Friday, sooner than expected. The customer may go to the tote management page 1100 and move the item from the tote into some other shipping option, or into the shopping cart, so that the item is shipped via a standard shipping method rather than via the tote delivery service. As another example, a customer may decide that he or she does not need an item scheduled for one-day delivery that soon, and so may move the item from the one-day delivery option into a virtual tote scheduled for delivery later in the week or next week, thus saving shipping costs.

Tote Delivery of Pre-Ordered and Back-Ordered Items

A network enterprise may allow customers to pre-order items. For example, books, DVDs, electronic games, and similar items may be scheduled for release on dates that may be months in the future. The network site may allow a customer to pre-order such an item via the user interface so that the customer is allocated and shipped the item when the item is finally released. In some embodiments, the user interface may allow the customer to select tote delivery via the tote delivery service as the shipping option for the pre-ordered item. For example, on a web page on which the customer pre-orders the item (which may be similar to an item detail page such as those shown in FIGS. 8, 13, and 14), the web page may include a "schedule for tote delivery" UI element via which the user may place the pre-ordered item in a virtual tote for delivery on a future tote delivery day that is on or after the scheduled release date of the item.

Similarly, a network enterprise may allow customers to back-order items. For example, a given item may be out of stock, but a shipment of the item may be expected to be received days or weeks in the future. The network site may allow a customer to back-order such an item via the user interface so that the customer is allocated and shipped the item after the item is received. In some embodiments, the user interface may allow the customer to select tote delivery via the tote delivery service as the shipping option for the back-ordered item. For example, on a web page on which the customer back-orders the item (which may be similar to an item detail page such as those shown in FIGS. 8, 13, and 14), the web page may include a "schedule for tote delivery" UI element via which the user may place the back-ordered item in a virtual tote for delivery on a future tote delivery day that is on or after the expected receiving date of the item.

Pre-ordered and back-ordered items may be viewed by the customer in virtual totes to be delivered on future tote delivery days, for example on a tote management page 1100 as illustrated in FIG. 15. This enables the customer to keep track of pre-ordered and back-ordered items, as the customer can browse through future scheduled tote deliveries to view what items the customer has pending to be delivered and when the items are scheduled to be delivered via the tote delivery service.

Scheduling Regular Tote Deliveries

For at least some items, for example consumables such as pet food, paper products, and so on, a customer may desire to have some quantity of the items (e.g., a bag of dog food, five rolls of paper towels, one box of printer paper, etc.) delivered periodically (e.g., once a week, bi-monthly, once a month, or once every three months) to a given customer address. The network site may thus allow a customer to schedule automatic order fulfillment and tote delivery on periodic tote days of at least some items via the user interface so that a specified quantity of an item is delivered to a specified customer address. In some embodiments, an item detail page (which may be similar to an item detail page such as those shown in FIGS. 8, 13, and 14) may provide one or more UI elements via which the customer may specify a number of units of the item to be automatically ordered and delivered by tote to a specified address at a specified interval. For example, a customer may specify that a bag of dog food is to be delivered to the customer's home address by tote once every two weeks. As another example, a customer may specify that four packages of printer paper are to be delivered to the customer's business address by tote once a month. As another example, a customer may specify that one or more units of an item is to be delivered to the customer's home address by tote each week. Prior to the scheduled periodic tote delivery day, the tote delivery service back end automatically picks the specified quantity of the item and transfers the item(s) to the appropriate sortation node; the item is then placed into the customer's tote for delivery on the tote delivery day.

In at least some embodiments, items that are scheduled for regular, automatic tote delivery may be viewed by the customer in virtual totes to be delivered on future tote delivery days, for example on a tote management page 1100 as illustrated in FIG. 15. This enables the customer to view what items the customer has scheduled to be automatically delivered by tote and when the items are scheduled to be delivered via the tote delivery service. In addition, the tote management page may provide one or more methods via which the customer can schedule items or entire tote orders for regular tote delivery, cancel scheduled tote deliveries, or otherwise modify tote deliveries.

Recommendations and Reminders

At least some embodiments of the tote delivery service may provide recommendations and reminders to the customer via the user interface to the network site and/or via alternative communications channels such as email and text messaging. To generate recommendations and/or reminders, network enterprise logic may examine information stored in enterprise data, including but not limited to tote delivery data. The tote delivery data includes customer tote ordering history (records of previous tote orders) as well as information on upcoming customer tote orders. Other information stored in enterprise data, such as product data and inventory data, may also be examined in generating recommendations and/or reminders. In some embodiments, other information than that stored in enterprise data may be obtained and analyzed to generate recommendations and/or reminders. For example, data indicating consumer purchasing patterns or other consumer metrics, statistics, and demographics may be obtained from one or more other external sources, such as other consumer goods enterprises and consumer research entities, and used in generating recommendations for customers.

As an example of a recommendation, the network enterprise logic may detect that a customer orders some item periodically, for example once a month or every three months, via a conventional ordering method. The network enterprise logic may generate and provide a recommendation to the customer stating something like "You appear to order N units of item X once a month. Would you like to schedule N units of item X to be delivered in a reusable tote to your doorstep on the first Friday of every month to save you time and shipping costs?" Alternatively, the network enterprise logic may generate and provide a recommendation to the customer stating something like "You may be running low on item X. Would you like to add item X to your tote scheduled to be delivered this Saturday?"

As another example of a recommendation, the network enterprise logic may examine the contents of a given customer tote and, based on that examination, determine one or more other items that are related to the items in the tote. The network enterprise logic may generate and provide a recommendation to the customer stating something like "These items (A, B, and C) are in your tote scheduled for delivery this Friday. Do you want to also include this item D in the tote?"

As another example of a recommendation, the network enterprise logic may examine consumer information obtained from network enterprise data and/or from one or more external sources to determine a purchasing trend, for example that a product X is popular in a particular customer's area, age group, or other demographic. The network enterprise logic may generate and provide a recommendation to the customer advertising product X and asking if the customer wants to add this product to an upcoming tote, or schedule the product for scheduled delivery by tote.

In addition to recommendations, the customer may also be provided with reminders of what items the customer has scheduled for tote delivery on upcoming tote delivery days. The reminders may, for example, let the customer know which tote days the customer should expect a tote to be placed on their doorstep, what the cutoff day is for placing items into (or removing items from) a given tote, and what will be delivered in the totes on those tote days. For example, a reminder might state something like "Item Y is scheduled to be delivered in a reusable tote to your doorstep this coming Wednesday," or "M units of item Z are scheduled to be delivered in a reusable tote to your doorstep on Thursday, June 17." Another example of a reminder may be something like "Your tote delivery on Thursday, June 17, will include one unit of item Y and 3 units of item Z. If you wish to make changes to this tote delivery, please do so before 6 am on Tuesday, June 15." A reminder message may also mention that the customer may go to their tote management page to add or remove items from a given tote, or to change the quantities of the items to be delivered.

Via the recommendations and reminders, customers may, for example, be prompted to wait for a scheduled delivery of an item via tote, or add an item to a tote, rather than making a trip to the store to pick up the item. As another example, customers may be prompted to consolidate shopping cart orders (i.e., items ordered according to other shipping options than tote delivery) into upcoming tote orders. For example, a customer may have a tote order scheduled to be delivered on Wednesday. On Tuesday, the customer may order an item Z according to a two-day shipping option. A recommendation may be generated and sent to the customer saying something like "You have ordered item X for delivery by FedEx on Thursday. Would you like to consolidate this item into your tote order for tomorrow?"

Returning Items in Totes

At least some embodiments of the tote delivery service may allow a customer to return previously delivered items in totes. In at least some embodiments, a customer may place one or more items to be returned to the network enterprise in a tote to be returned. The user interface may provide one or more user interface elements whereby the customer can inform the network enterprise that the item(s) are being returned via tote on a tote delivery (and pickup) day. For example, in some embodiments, the user interface may provide a tote return page, for example tote return page 1150 illustrated in FIG. 16, that may be reached by selecting a "Return an item by tote" user interface element on one or more other web pages. As another example, in some embodiments, an item detail page, such as such as item detail page 400 shown in FIG. 8, item detail page 900 shown in FIG. 13, or item detail page 1000 shown in FIG. 14, or other pages such as tote order confirmation page 800 shown in FIG. 12, may include a "return item by tote" user interface element that, when selected, records that the customer is going to return at least one unit of the respective item in a specified tote. As another example, in some embodiments, a tote management page, such as tote management page 1100, may include a "return item by tote" user interface element. In some embodiments, a tote management page, such as tote management page 1100, may display, in addition to totes 1112 to be delivered on tote delivery days, a "return tote" to be picked up on the next tote delivery day, and may also include at least one user interface element that allows a customer to place item(s) to be returned into the return tote or remove item(s) from a return tote, or to otherwise specify that an item is to be returned via a return tote.

In addition to allowing a customer to return individual items, in at least some embodiments, the user interface may provide one or more user interface elements that allow a customer to return entire tote orders. For example, in some embodiments, a tote management page, such as tote management page 1100, may include a "return tote" user interface element or elements that allow a customer to select entire tote orders and specify that the tote orders are to be returned by tote.

Using this ability to easily return items to the network enterprise in the reusable totes, at least some embodiments may enable "order bracketing" where the customer can order, for example, three pairs of the same shoe in different sizes, or three of the same item in different colors, and return the items (e.g., the pairs of shoes that don't fit, or the items that aren't the desired color) that the customer decides not to keep.

In some embodiments, only items that were previously delivered via the tote delivery service may be returned via the tote delivery service. However, in some embodiments, items that are shipped according to other shipping methods may also be returned to the network enterprise via the tote delivery service.

While the above describes returning items that were delivered according to the tote delivery service in return totes, note that, in at least some embodiments, at least some items delivered to customers via the tote delivery service may be returned by other return methods than in return totes.

Inventory Ingestion Via Return Totes

In some embodiments, other items than items being returned to the network enterprise may be delivered from a customer, or from a seller or merchant, to the network enterprise, or to other entities, via return totes and the tote delivery service. For example, in various implementations, rentals, such as video game rentals, DVD/Blu-Ray Disc rentals, tool rentals, and so on, may be delivered to the customer in totes (or by some other delivery method) and returned to the network enterprise (or to a rental enterprise) via returned totes and the tote delivery service.

As another example, an exchange method may be provided via the tote delivery service whereby a customer may return a damaged item or a wrong item for exchange. In some embodiments, the user interface may provide one or more user interface elements whereby the customer may inform the network enterprise that the customer has received a damaged item, or the wrong item, that needs to be replaced. Alternatively, other communications channels may be used to inform the network enterprise that an item needs to be exchanged. A replacement item may be delivered to the customer, either by tote delivery or by a conventional shipping method, and the damaged or wrong item may be placed into a return tote for delivery to the network enterprise. The item may be placed into the tote for pickup either prior to, on the same day as, or subsequent to the day that the replacement item is delivered to the customer.

In various embodiments, items including, but not limited to, items for repair, items being sent to the network enterprise for credit or resale, and other types of items may be delivered from a customer to the network enterprise, or to some other entity, via return totes and the tote delivery service.

In some embodiments, return totes may be used to deliver inventory from other entities, such as merchants or sellers, to the network enterprise. For example, a merchant or seller may provide one or more different items to the network enterprise that may be placed into the network enterprise's inventory, in some cases for sale via the network site. The tote delivery service may be provided to an address of the merchant or seller. The merchant or seller may place items to be delivered to the network enterprise into a return tote that is picked up and delivered to a sortation node on a tote delivery run. At the sortation node, the items may be processed into inventory, or may be transferred to some other facility or facilities, such as a fulfillment center, for processing. In some embodiments, items received from a merchant or seller at a sortation node may be stored at the sortation node for fulfilling tote orders.

In some embodiments, the tote delivery service may be provided to customers of other enterprises, such as other network enterprises than the network enterprise that provides the tote delivery service. As another example of a use for the return totes, the other enterprise may deliver ordered items to a sortation node via return totes. The other enterprise's items may then be sorted into outgoing totes to fulfill their customers' tote orders. Note that, in some embodiments, the other enterprise's items may be placed into totes along with items from the network enterprise that provides the tote delivery service.

Back End Operations—Tote Order Fulfillment and Tote Order Delivery

In back end operations, tote delivery service logic of enterprise logic may retrieve and process tote delivery data to generate bulk transfer data. In some embodiments, this retrieving and processing may be performed subsequent to the cutoff time for a given tote delivery day. For example, the cutoff time for Friday tote delivery may be Tuesday night, so the tote delivery data may be retrieved and processed at some time Wednesday morning. In some embodiments, at least some retrieving and processing of tote delivery data for a given tote delivery day may be performed prior to the cutoff time for the tote delivery day. The bulk transfer data may be provided to one or more fulfillment centers of the network enterprise's order fulfillment network as bulk transfer orders. In at least some embodiments, a bulk transfer order directs a fulfillment center to bulk-transfer items for delivery on a specific tote delivery day to at least one of one or more tote delivery service sortation nodes. In some embodiments, a bulk transfer order may direct a fulfillment center to bulk-transfer items for delivery on two or more tote delivery days to a sortation node.

While the following generally describes a fulfillment center processing a bulk transfer order to generate a bulk transfer to a particular sortation node for a particular tote delivery day, in some implementations, a fulfillment center may process bulk transfer orders for a particular sortation node for two or more delivery days to generate one bulk transfer that includes at least some of the items required for the two or more delivery days. For example, a fulfillment center may receive bulk transfer orders for Thursday and Friday tote delivery days at a particular sortation node. The bulk transfer orders may be picked and consolidated into one bulk transfer to the sortation node.

FIG. 17 illustrates the physical layout and operations of an example fulfillment center when fulfilling a bulk transfer order, according to some embodiments. Note that FIG. 17 and the description thereof are given by way of example, and are not intended to be limiting. A control system 1250 for fulfillment center 350 may receive bulk transfer data 338, for example a bulk transfer order, from a network enterprise system that implements enterprise logic, e.g. enterprise logic 330 as shown in FIG. 5. One or more agents 1242 may each pick items from inventory 1230 to fulfill portions or all of the bulk transfer order 338. In some embodiments, agents 1242 may receive pick instructions from control system 1250 on a device such as an RF-connected wireless terminal or handheld scanner, to go to locations in inventory 1230 to pick a list of items for the bulk transfer order 338 from those locations. This may result in a stream and/or batches of picked items for the bulk transfer order, which may then be delivered to at least one station 1260, for example a packing station, in the fulfillment center 350 for processing prior to shipping 1270. A stream may be a continuous or nearly continuous flow of picked items arriving at a station, while groups of items arriving periodically or aperiodically at a station may be referred to as batches.

The stream or batches of incoming picked items for the bulk transfer may be processed at the station 1260. In some embodiments, a tote delivery service sortation node may be located within a fulfillment center such as fulfillment center 350; in these embodiments, the station 1260 that the items picked for a bulk transfer order 338 may be a tote delivery service sortation node, for example as illustrated in FIG. 18, and thus the items for the bulk transfer order may be sorted into physical totes for delivery according to tote delivery service sortation node processing, for example as described in relation to FIG. 18. Referring to FIG. 17, if the bulk transfer order is for a tote delivery service sortation node that is not in the fulfillment center 350, e.g. that is in another fulfillment center or in a stand-alone sortation node location, the picked items for the bulk transfer may be packed or loaded into one or more bulk transfer containers. Bulk transfer containers may be relatively large receptacles, e.g., shipping boxes or bins, that can be loaded onto trucks, large metal shipping containers, or other appropriate types of containers. Once all of the items for a bulk transfer order are loaded, the bulk transfer container(s) may be shipped to the corresponding tote delivery service sortation node as an outgoing bulk transfer 352.

A fulfillment center 350 may also include a receiving 1280 station for receiving new inventory 1290 from various vendors, merchants, or other sources. The received inventory 1290 may then be placed into stock storage. A receiving 1280 station may also receive and process returned, purchased, or rented items 1292 from customers. At least some of these returned items 1292 are typically returned to inventory 1230. If the fulfillment center includes a tote delivery service sortation node, receiving 1280 may also receive bulk transfers 352 from other fulfillment centers and returned totes from tote delivery runs, some of which may include returned items which may be pulled from the returned totes and processed by receiving 1280 personnel, or alternatively by personnel at the tote delivery service sortation node or at some other station 1260. In some embodiments, processing a returned item may include scanning the item and the tote it is pulled from so that the respective customer's account may be credited. Processing a returned item may also include processing the item back into inventory of the network enterprise or processing the item for return to a product provider for the network enterprise such as a vendor, merchant, or manufacturer. In some embodiments, rather than being put into inventory 1230, some items received at receiving 1280 station may be transferred directly to a station 1260 for order fulfillment, for example for processing according to the tote delivery service processing as described herein.

Note that the various operations and stations of a fulfillment center 350 may be located in one building or facility, or alternatively may be spread or subdivided across two or more buildings or facilities.

The tote delivery service logic of enterprise logic may also process tote delivery data to generate zone delivery data. The zone delivery data may be provided to one or more tote delivery service sortation nodes. A sortation node may be a node in the network enterprise's order fulfillment network that is owned and operated by the network enterprise. Alternatively, a sortation node may be owned and/or operated by another entity, such as a local carrier or delivery company that owns and/or operates the tote delivery vehicles. In at least some embodiments, the zone delivery data directs the tote delivery service sortation nodes in sorting the items received in one or more bulk transfers 352 into reusable totes for delivery to specific customer addresses in specific delivery zones on respective zone tote delivery days.

FIG. 18 illustrates operations of an example tote delivery service sortation node according to some embodiments. A tote delivery service sortation node 360 may provide the tote delivery service to one or more delivery zones. For simplicity, FIG. 18 shows only one delivery zone (delivery zone 370A). In some embodiments, the delivery zones may be determined by zip code. In other embodiments, other geographic information, or other types of information, may be used to determine delivery zones. Generally, a sortation node 360 will deliver to multiple zones, with different ones of the zones scheduled for delivery on different days of the week. Note that, in some implementations, the tote delivery service may be provided every day of the week, and in other implementations the tote delivery service may not be provided on some days (e.g., Monday through Saturday or Monday through Friday). A sortation node 360 may, but does not necessarily, deliver to more than one zone on a given day. In some embodiments, for at least some zones, a respective sortation node 360 may deliver to at least some customers in the zone on two or more days a week. Generally, only one sortation node 360 serves each tote delivery zone; however, in some implementations, two or more sortation nodes 360 may serve the same zone.

Sortation node 360 may include a receiving 1380 station that receives bulk transfers 352 of items for one or more zone delivery runs from one or more fulfillment centers 350. In some embodiments, in addition to bulk transfers from fulfillment centers 350, the sortation node may receive bulk transfers or other shipments directly from one or more other sources, such as vendors, manufacturers, and merchants, that include items for one or more zone delivery runs. A control system 1350 for sortation node 360 may receive zone delivery data 340 from a network enterprise system that implements enterprise logic, e.g. enterprise logic 330 as shown in FIG. 5. In some implementations, sortation node 360 may include or be associated with a local inventory of items. For example, in some embodiments, sortation node 360 may be located within a fulfillment center 350. Thus, the control system 1350 may also receive information directing the sortation node 360 (or the fulfillment center 350 that includes the sortation node 360) to pick at least some items for a zone delivery run from the local inventory.

The received bulk transfer 352 items, and the locally picked items 1310 if any, may be delivered in streams or batches to one or more sorting stations 1360 of the sorting node 360. At the sorting stations 1360, the received items may be manually and/or automatically sorted into customer totes. For example, in some embodiments, sorting station personnel, and/or an automated sorting device, may electronically scan each item and place the item into an appropriate customer tote, under direction of control system 1350 and according to the received zone delivery data 340. In some embodiments, under direction of control system 1350 and according to the received zone delivery data 340, items ordered by two or more customers that share the same tote delivery address may be consolidated into a single tote order to be delivered to the shared address. Once the appropriate items are sorted into the respective customer totes, the totes may be transferred to a shipping 1370 station and loaded onto one or more delivery vehicles for the delivery run. In some embodiments, the totes may be loaded onto rolling racks, and the racks may be loaded onto the delivery vehicles.

In some embodiments, each customer tote may include a tote delivery indicator that may identify at least a delivery address for the particular tote to the sorting station personnel, automated sorting equipment, and the delivery personnel. An example tote 250 with an example tote delivery indicator 252 is illustrated in FIG. 4A. The tote delivery indicator may, for example, be a printed label that is permanently affixed to the tote, or a removable printed label. In some embodiments, the tote delivery indicator may be a tag that may be attached to and removed from a tote, for example the tag may be attached to a handle of a tote. In some embodiments, the tote delivery indicator may be a radio-frequency identification (RFID) tag, or other type of electronic tag, that may be electronically scanned, e.g. using a hand-held scanner, to identify at least the delivery address for the tote. In some embodiments, an electronic tag may be programmable at the sortation node 360 so that the delivery address (or other information) indicated by the tag on a given tote may be changed if and when necessary. In some embodiments, the tote delivery indicator may include or may be a bar code that may be programmed to indicate the particular tote delivery and that may be scanned by tote delivery personnel and/or sortation node personnel or automated sorting devices.

As an example of a tote delivery indicator, in some embodiments, the tote delivery indicator may be a tag that can be attached to and removed from a tote. The tag may include a bar code that corresponds to the tote order. The enterprise logic may associate the particular bar code on a given tag with the particular tote order. The tag may be attached to the respective tote and delivered to the customer delivery address. The customer may return the tote with the tag attached, or remove the tag if they want to keep the tote. In addition, if the customer wants to return one or more items in the tote order, the customer may attach the tag to a return tote or include the tag in the return tote along with the item(s). At the sortation node, the bar code can then be scanned to correlate the returned items with the original tote order.

In some embodiments, the totes may be placed into receptacles as shown in FIG. 4B, such as open-top bins, and the receptacles, including the totes, may then be loaded into the delivery vehicles. In some embodiments, the receptacles may already be in the delivery vehicles, and the totes may be placed into the receptacles inside the delivery vehicles. In some embodiments, one or more totes may be placed into each receptacle. In some embodiments, the receptacles into which the totes are placed may each include a tote delivery indicator 262 as shown in FIG. 4B that may be used by tote delivery personnel to determine the delivery address for the tote(s) contained therein. In at least these embodiments, the totes themselves may not include a tote delivery indicator.

Referring to FIG. 18, on a delivery run to tote delivery zone 370A, the delivery personnel on the delivery vehicle(s) drop each tote off at a respective customer address. Generally, only one tote will be dropped at a given customer address; however, in some cases, more than one tote may be required to deliver all the items in a tote order to be delivered on a given delivery day to a given customer address. The delivery personnel may also pick up one or more previously delivered totes from at least some customer addresses. A picked-up tote may be empty, or may include one or more previously delivered items that the respective customer is returning to the network enterprise. The delivery vehicles may then return the picked-up totes to the sortation node 360. At the sortation node 360, any returned items in the returned totes may be pulled from the totes and processed. In some embodiments, processing a returned item may include scanning the item and the tote it is pulled from so that the respective customer's account may be credited. Processing a returned item may also include processing the item back into inventory of the network enterprise or processing the item for return to a product provider for the network enterprise such as a vendor, merchant, or manufacturer.

FIG. 19 is a flowchart of back end operations for a tote delivery service, according to at least some embodiments. This flowchart assumes, by way of example, that a city has a single sortation node. Note that a city or other geographic region may have more than one sortation node. Furthermore, this flowchart represents back end operations for one delivery day; the elements of the flowchart may be repeated for each delivery day of a given sortation node for a geographic region such as city (e.g., Monday through Friday, or Monday through Saturday, or every day of the week).

As indicated at 1400, the items scheduled for tote delivery in a given city on a given delivery day are bulk-picked in one or more fulfillment centers. In some embodiments, tote delivery data may be received and processed subsequent to the cutoff time for the given delivery day to generate bulk transfer orders and zone delivery data. In some embodiments, at least some retrieving and processing of tote delivery data for a given tote delivery day may be performed prior to the cutoff time for the tote delivery day. The bulk transfer orders are provided to the one or more fulfillment centers, and direct each fulfillment center to bulk-transfer items for delivery on the delivery day to the tote delivery service sortation node for the city. As indicated at 1402, the bulk-picked items are bulk transferred to the tote delivery service sortation node for the city. A bulk transfer may be shipped from a fulfillment center one, two or more days before the delivery day, or in some cases on the delivery day, and may be received at the sortation node on the day of, or before, the delivery day. At the sortation node, the bulk-picked items are rebinned into reusable customer totes, as indicated at 1404. In some embodiments, the zone delivery data is provided to the tote delivery service sortation node for the city, and directs the tote delivery service sortation node in sorting the items received in the bulk transfers into the reusable totes for delivery to specific customer addresses. The customer totes are loaded onto one or more delivery vehicle(s) at the sortation node, as indicated at 1406. Generally, the rebinning into the totes and loading of the totes onto the delivery vehicle(s) may be performed on the delivery day, but in some implementations may be performed prior to the delivery day. As indicated at 1408, on the delivery day, the customer totes are delivered to respective customer addresses. As indicated at 1410, empty totes and totes including returned items may be retrieved by the delivery personnel and returned to the sortation node.

The above method describes the bulk picking and consolidated, bulk shipping of items for multiple customers' tote orders from fulfillment centers to sortation nodes for rebinning and delivery according to the tote delivery service. However, in some embodiments, at least some customer tote orders may be handled separately. That is, item(s) for a customer's tote order may be picked at a fulfillment center and transferred as a single, independent order shipment to a sortation node for placement into the customer's physical tote.

Illustrative System

In at least some embodiments, a server that implements a portion or all of network enterprise logic, including but not limited to tote delivery service logic for implementing embodiments of a tote delivery service, may include a general-purpose computer system that includes or is configured to access one or more computer-accessible media, such as computer system 2000 illustrated in FIG. 20. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods and techniques described above for implementing embodiments of a tote delivery service, are shown stored within system memory 2020 as code 2025.

In one embodiment, I/O interface 2030 may be configured to coordinate I/O traffic between processor(s) 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor(s) 2010.

Network interface 2040 may be configured to allow data to be exchanged between computer system 2000 and other devices 2060 attached to a network or networks 2050, such as other computer systems or devices as illustrated in FIGS. 5, 17 and 18, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 3 through 19 for implementing embodiments of a tote delivery service. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 2000 via I/O interface 2030. A computer-accessible medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A method, comprising:
processing, by enterprise logic implemented on one or more computer devices, tote delivery data indicating items to be delivered to delivery addresses in one or more zones via a tote delivery service from a sortation node that serves the one or more zones to generate bulk transfer data for two or more fulfillment centers and zone delivery data for the sortation node, wherein the tote delivery service delivers totes including items ordered by customers via a network site to delivery addresses corresponding to the customers on assigned tote delivery days;

picking, at each of the two or more fulfillment centers, items indicated by the bulk transfer data corresponding to the fulfillment center and bulk transferring the picked items to the sortation node, wherein at least some of the items are picked at the two or more fulfillment centers as single units of a respective item, wherein the bulk transfer from each of the two or more fulfillment centers is an unsorted collection of the items picked at the respective fulfillment center, wherein the picked items in the unsorted collection are not sorted according to delivery orders for delivery addresses;

receiving, at the sortation node, the bulk transfer from each of the two or more fulfillment centers and sorting the unsorted collections of items from the bulk transfers into totes corresponding to the delivery addresses according to the zone delivery data;

loading, at the sortation node, the totes including the sorted items onto one or more delivery vehicles; and each delivery vehicle delivering totes to delivery addresses in at least one of the one or more zones.

2. The method as recited in claim 1, further comprising:

receiving, at the sortation node, a direct transfer of items from a vendor; and sorting the items from the direct transfer into the totes corresponding to the delivery addresses according to the zone delivery data.

3. The method as recited in claim 1, further comprising at least one delivery vehicle retrieving at least one previously delivered tote from at least one delivery address and returning the at least one retrieved tote to the sortation node.

4. The method as recited in claim 1, wherein the sortation node is a station within one of the two or more fulfillment centers.

5. The method as recited in claim 4, wherein the items picked for the bulk transfer in the fulfillment center that includes the sortation node are transferred to the sortation node within the fulfillment center.

6. The method as recited in claim 1, further comprising sorting one or more items picked from inventory stored at the sortation node into the totes corresponding to the delivery addresses according to the zone delivery data.

7. The method as recited in claim 1, wherein at least one bulk transfer from the two or more fulfillment centers includes items for two or more tote delivery days.

8. The method as recited in claim 1, wherein the zones are determined by zip code.

9. The method as recited in claim 1, wherein the tote delivery days are assigned according to zip code of the delivery addresses.

10. A system, comprising:

one or more data storage devices that store data including tote delivery data for an enterprise, wherein the tote delivery data indicates items to be delivered to delivery addresses in one or more zones via a tote delivery service from a sortation node that serves the one or more zones; and one or more servers that implement enterprise logic executable on the one or more servers to:

process the tote delivery data to generate bulk transfer data for two or more fulfillment centers and zone delivery data for the sortation node, wherein the tote delivery service delivers totes including items ordered by customers to delivery addresses corresponding to the customers on assigned tote delivery days;

direct picking, at each of the two or more fulfillment centers, of items according to the bulk transfer data corresponding to the fulfillment center, wherein at least some of the items are picked at the two or more fulfillment centers as single units of a respective item;

direct bulk transfer of the picked items from each of the two or more fulfillment centers to the sortation node, wherein the bulk transfer from each of the two or more fulfillment centers is an unsorted collection of the items picked at the respective fulfillment center, wherein the picked items in the unsorted collection are not sorted according to delivery orders for delivery addresses; and direct sorting, at the sortation node, of the unsorted collections of items from the bulk transfers into totes corresponding to the delivery addresses according to the zone delivery data.

11. The system as recited in claim 10, wherein the enterprise logic is executable on the one or more servers to direct sorting, at the sortation node, of items received at the sortation node in a direct transfer from a vendor into the totes corresponding to the delivery addresses according to the zone delivery data.

12. The system as recited in claim 10, wherein the enterprise logic is executable on the one or more servers to direct loading, at the sortation node, of the totes including the sorted items onto one or more delivery vehicles.

13. The system as recited in claim 12, wherein the enterprise logic is executable on the one or more servers to direct each delivery vehicle in delivering totes to delivery addresses in at least one of the one or more zones.

14. The system as recited in claim 13, wherein the enterprise logic is executable on the one or more servers to direct at least one delivery vehicle to retrieve at least one previously delivered tote from at least one delivery address and return the at least one retrieved tote to the sortation node.

15. The system as recited in claim 10, wherein the sortation node is a station within one of the two or more fulfillment centers.

16. The system as recited in claim 15, wherein the enterprise logic is executable on the one or more servers to direct the transfer of the items picked for the bulk transfer in the fulfillment center that includes the sortation node to the sortation node within the fulfillment center.

17. The system as recited in claim 10, wherein the enterprise logic is executable on the one or more servers to direct picking of items from inventory stored at the sortation node and sorting of the items picked from the inventory stored at the sortation node into the totes corresponding to the delivery addresses according to the zone delivery data.

18. The system as recited in claim 10, wherein at least one bulk transfer from the two or more fulfillment centers includes items for two or more tote delivery days.

19. The system as recited in claim 10, wherein the enterprise logic is executable on the one or more servers to determine the zones according to zip code.

20. The system as recited in claim 10, wherein the enterprise logic is executable on the one or more servers to assign the tote delivery days according to zip code of the delivery addresses.

21. A non-transitory computer-readable storage medium storing program instructions, wherein the program instructions are computer-executable to implement:

processing tote delivery data to generate bulk transfer data for two or more fulfillment centers and zone delivery data for a sortation node, wherein said tote delivery data indicates items in tote orders to be delivered from the sortation node to customers of an enterprise via a tote delivery service, wherein the tote delivery service delivers tote orders to the customers on assigned tote delivery days, wherein each tote delivery includes one or more totes that include a tote order of one or more items;

directing picking, at each of the two or more fulfillment centers, of items according to the bulk transfer data corresponding to the fulfillment center, wherein at least some of the items are picked at the two or more fulfillment centers as single units of a respective item;

directing bulk transfer of the picked items from each of the two or more fulfillment centers to the sortation node, wherein the bulk transfer from each of the two or more fulfillment centers is an unsorted collection of the items picked at the respective fulfillment center, wherein the picked items in the unsorted collection are not sorted according to delivery orders for delivery addresses; and directing sorting, at the sortation node, of the unsorted collections of items from the bulk transfers into totes corresponding to the delivery addresses according to the zone delivery data.

22. The non-transitory computer-readable storage medium as recited in claim 21, wherein the program instructions are computer-executable to implement directing sorting, at the sortation node, of items received at the sortation node in a direct transfer from a vendor into the totes corresponding to the delivery addresses according to the zone delivery data.

23. The non-transitory computer-readable storage medium as recited in claim 21, wherein the program instructions are computer-executable to implement directing loading, at the sortation node, of the totes including the sorted items onto one or more delivery vehicles.

24. The non-transitory computer-readable storage medium as recited in claim 23, wherein the program instructions are computer-executable to implement directing each delivery vehicle in delivering totes to delivery addresses in at least one of the one or more zones.

25. The non-transitory computer-readable storage medium as recited in claim 24, wherein the program instructions are computer-executable to implement directing at least one delivery vehicle to retrieve at least one previously delivered tote from at least one delivery address and return the at least one retrieved tote to the sortation node.

26. The non-transitory computer-readable storage medium as recited in claim 21, wherein the sortation node is a station within one of the two or more fulfillment centers.

27. The non-transitory computer-readable storage medium as recited in claim 26, wherein the program instructions are computer-executable to implement directing the transfer of the items picked for the bulk transfer in the fulfillment center that includes the sortation node to the sortation node within the fulfillment center.

28. The non-transitory computer-readable storage medium as recited in claim 21, wherein the program instructions are computer-executable to implement directing picking of items from inventory stored at the sortation node and sorting of the items picked from the inventory stored at the sortation node into the totes corresponding to the delivery addresses according to the zone delivery data.

29. The non-transitory computer-readable storage medium as recited in claim 21, wherein at least one bulk transfer from the two or more fulfillment centers include items for two or more tote delivery days.

30. The non-transitory computer-readable storage medium as recited in claim 21, wherein the program instructions are computer-executable to implement determining the zones according to zip code.

31. The non-transitory computer-readable storage medium as recited in claim 21, wherein the program instructions are computer-executable to implement assigning the tote delivery days according to zip code of the delivery addresses.

* * * * *